US009822553B1

(12) United States Patent
Ho et al.

(10) Patent No.: US 9,822,553 B1
(45) Date of Patent: Nov. 21, 2017

(54) DOOR TRACKING SYSTEM AND METHOD

(71) Applicant: Gate Labs Inc., San Francisco, CA (US)

(72) Inventors: Harvey Ho, San Francisco, CA (US); Ehsan Saeedi, San Francisco, CA (US); Danial Ehyaie, San Francisco, CA (US)

(73) Assignee: Gate Labs Inc., San Francisco, CA (US)

( * ) Notice: Subject to any disclaimer, the term of this patent is extended or adjusted under 35 U.S.C. 154(b) by 0 days.

(21) Appl. No.: 15/360,758

(22) Filed: Nov. 23, 2016

(51) Int. Cl.

| | |
|---|---|
| ***E05B 49/00*** | (2006.01) |
| ***E05B 63/04*** | (2006.01) |
| ***G01B 11/02*** | (2006.01) |
| ***H04M 11/04*** | (2006.01) |
| ***H04L 12/22*** | (2006.01) |
| ***G08B 13/196*** | (2006.01) |
| ***E05B 47/00*** | (2006.01) |
| ***G01B 11/00*** | (2006.01) |
| *G07C 9/00* | (2006.01) |

(52) U.S. Cl.
CPC .......... *E05B 47/0012* (2013.01); *E05B 49/00* (2013.01); *E05B 63/04* (2013.01); *G01B 11/002* (2013.01); *E05B 2047/0058* (2013.01); *E05B 2047/0068* (2013.01); *E05B 2047/0069* (2013.01); *E05B 2047/0084* (2013.01); *G07C 2009/00769* (2013.01)

(58) Field of Classification Search
CPC ....... E05B 49/00; E05B 63/04; G01B 11/002; H04M 11/04; H04L 12/22; G08B 13/196
USPC .......... 340/5.32, 5.7; 187/316, 391; 348/143
See application file for complete search history.

(56) References Cited

U.S. PATENT DOCUMENTS

| | | | | |
|---|---|---|---|---|
| 4,241,337 | A | 12/1980 | Prada | |
| 4,814,557 | A | 3/1989 | Kato | |
| 4,881,766 | A | 11/1989 | Schmidt et al. | |
| 6,147,622 | A | 11/2000 | Fonea | |
| 6,259,352 | B1 * | 7/2001 | Yulkowski | E05B 47/00 340/5.7 |
| 6,339,375 | B1 * | 1/2002 | Hirata | G01V 8/10 187/317 |
| 6,441,735 | B1 | 8/2002 | Marko et al. | |
| 7,031,525 | B2 | 4/2006 | Beardsley | |
| 7,140,469 | B2 * | 11/2006 | Deplazes | B66B 1/3476 187/316 |
| 7,457,437 | B2 * | 11/2008 | Ertl | G06K 9/00624 382/100 |
| 7,490,525 | B2 | 2/2009 | Tanaka et al. | |
| 7,874,190 | B2 | 1/2011 | Krisch et al. | |
| 7,971,316 | B2 | 7/2011 | Copeland et al. | |
| 8,103,105 | B2 * | 1/2012 | Kuroda | G06T 7/12 382/199 |
| 8,436,628 | B2 | 5/2013 | Uhov et al. | |

(Continued)

FOREIGN PATENT DOCUMENTS

| | | |
|---|---|---|
| CN | 103528341 | 3/2016 |

*Primary Examiner* — Nam V Nguyen
(74) *Attorney, Agent, or Firm* — Levine Bagade Han LLP

(57) ABSTRACT

A locking device that can be mounted into a rotating or swinging door is disclosed. The locking device can have a deadbolt. The locking device can detect the position of the deadbolt and/or whether the door is closed. The locking device can have a camera, microphone and speaker. The locking device can send images detected by the camera and audio detected by the microphones to a remote computer.

17 Claims, 16 Drawing Sheets

(56) References Cited

U.S. PATENT DOCUMENTS

| | | | | |
|---|---|---|---|---|
| 8,660,700 | B2 * | 2/2014 | Jia | B66B 13/143 187/317 |
| 8,866,439 | B2 | 10/2014 | Pukari et al. | |
| 9,064,394 | B1 * | 6/2015 | Trundle | G08B 13/19684 |
| 9,316,022 | B2 | 4/2016 | Tyner et al. | |
| 9,503,635 | B2 * | 11/2016 | Ryu | H04N 5/2252 |
| 2003/0168288 | A1 | 9/2003 | Deplazes et al. | |
| 2003/0218542 | A1 * | 11/2003 | Barendt | G08B 13/19645 340/545.1 |
| 2004/0099069 | A1 | 5/2004 | Osentoski | |
| 2006/0192396 | A1 | 8/2006 | Frolov et al. | |
| 2011/0202178 | A1 | 8/2011 | Zhen et al. | |
| 2012/0268237 | A1 * | 10/2012 | Lee | E05F 15/73 340/5.7 |
| 2012/0272576 | A1 * | 11/2012 | Van Tassell, III | E05F 15/641 49/70 |
| 2013/0245833 | A1 | 9/2013 | McKibben et al. | |
| 2014/0047878 | A1 | 2/2014 | Zheng et al. | |
| 2014/0265359 | A1 | 9/2014 | Cheng et al. | |
| 2014/0267716 | A1 * | 9/2014 | Child | H04N 7/186 348/143 |
| 2014/0277757 | A1 * | 9/2014 | Wang | G05D 23/1927 700/276 |
| 2014/0292001 | A1 | 10/2014 | Nunez et al. | |
| 2015/0027057 | A1 | 1/2015 | Britt et al. | |
| 2015/0102610 | A1 | 4/2015 | Johnson et al. | |
| 2016/0047145 | A1 | 2/2016 | Johnson et al. | |
| 2016/0055694 | A1 | 2/2016 | Saeedi et al. | |
| 2016/0055695 | A1 | 2/2016 | Saeedi et al. | |
| 2016/0180618 | A1 | 6/2016 | Ho et al. | |
| 2016/0282039 | A1 * | 9/2016 | Motukuri | F25D 27/005 |
| 2016/0307380 | A1 | 10/2016 | Ho et al. | |
| 2016/0348415 | A1 * | 12/2016 | Baumgarte | E05F 15/40 |
| 2017/0030135 | A1 * | 2/2017 | Elie | E05F 15/41 |
| 2017/0030737 | A1 * | 2/2017 | Elie | E05F 15/70 |

* cited by examiner

DOOR TRACKING SYSTEM AND METHOD

BACKGROUND

Many types of resources, such as physical properties/entities, virtual properties/entities, etc., are access controlled. Examples of physical properties/entities include, for example, a house, office, automobile, etc. Examples of virtual properties/entities include, for example, a bank account, investment account, website login ID, credit account, etc.

To manage access to physical properties/entities, proprietors often use physical locks to restrict access to authorized individuals. A proprietor grants an authorized individual access to a physical property/entity, such as a house, car, etc., by providing the authorized individual with a physical key to the lock of the house, car, etc. This may involve going to a lock smith to make a copy of the key in order to have a spare key to provide to the individual.

Further, once an individual has a key, disabling access to the property/entity may be difficult. For example, the individual may lose or refuse to return the key, or may, unknown to the proprietor, make a copy of the key. In such a situation, a proprietor may need to pay a lock smith to re-key the lock in order to eliminate access to an unauthorized possessor of a key.

Similar issues exist for managing access to virtual properties/entities, such as when a party responsible for a credit account wants to authorize another person to access the credit account. For example, a business owner may want to authorize an employee to access his business credit account to purchase supplies for the business. To do this, the business owner may need to apply for and obtain a credit card for the employee, or the business owner may provide his credit card to the employee for the employee to use to purchase the business supplies.

Taking measures such as those described above to enable an authorized individual to access a virtual property/entity, such as enabling the employee to access the business credit account, has inherent complexities and/or risks. Further, these complexities and/or risks increase, in some cases exponentially, as the number of authorized individuals increases.

SUMMARY OF THE INVENTION

A system for sensing the position of a lock is disclosed. The system can have a bolt, a bolt motor, an interference element, and a sensor. The bolt can have at least a first bolt position and a second bolt position. The bolt motor can be configured to move the bolt from the first position to the second position. The sensor can have a first mechanical switch and a second mechanical switch.

When the interference element and the sensor are in a first orientation with respect to the bolt, one of the interference element or the sensor can be attached to the bolt such that the attached interference element or sensor can rotate between a first rotational position when the bolt is in the first bolt position, and a second rotational position when the bolt is in the second bolt position.

The first mechanical switch can be activated by the interference element when the attached interference element or sensor is in the first rotational position. The second mechanical switch can be activated by the interference element when the attached interference element or sensor is in the second rotational position.

The second mechanical switch can be inactive when the attached interference element or sensor is in the first rotational position. The first mechanical switch can be inactive when the attached interference element or sensor is in the second rotational position.

The first rotational position can be from about 45° to about 135° away from the second rotational position.

The sensor can have a third mechanical switch. The interference element and sensor can have a second orientation with respect to the bolt. The second orientation can be opposite the first orientation.

When the interference element and the sensor are in the second orientation, one of the interference element or the sensor can be attached to the bolt such that the attached interference element or sensor can rotate between a second rotational position when the bolt is in the first bolt position, and a third rotational position when the bolt is in the second bolt position.

The second mechanical switch can be activated by the interference element when the attached interference element or sensor is in the second rotational position. The third mechanical switch can be activated by the interference element when the attached interference element or sensor is in the third rotational position.

The first rotational position can be from about 45° to about 135° away from the second rotational position in a first direction. The third rotational position can be from about 45° to about 135° away from the second rotational position in a second direction opposite to the first direction.

The first and second mechanical switches can have toggle switches.

The system can have a remote signal sensor configured to receive a wireless signal to activate the bolt motor.

The system can have a processor and a sensor configured to detect a motor current. The system can be configured that when the sensor detects that the motor current exceeds a reference value, the processor can signal that the bolt is positioned at an extent of travel for the bolt (e.g., that the bolt is in a locked position).

The system can have a door position sensor.

The system can have a lock cylinder. The one of the interference element or the sensor that is attached to the bolt can be rotationally fixed to at least part of the lock cylinder.

A method for detecting a position of a door is disclosed. The method can include capturing a reference image data with a camera fixed to the door when the door is in a first position. The method can also include capturing a second image data with the camera fixed to the door. The capturing of the second image data can be after the capturing of the reference image data. The method can also include comparing the reference image data to the second image data. The comparing can be performed at least in part by a processor.

When the processor resolves that the second image data matches the reference image data within a preset matching threshold, then the processor can resolve that the door is in the first position (e.g., closed).

When the processor resolves that the second image data does not match the reference image data within the present matching threshold, the processor can then resolve that the door is in a second position (e.g., opened).

The method can include the processor triggering an alert signal when the processor resolves that the door is in the second position.

The comparing of the reference image data to the second image data can include edge detection.

The method can include rotating the door between the first position and a second position.

The method can include emitting a signal from an emitter attached to a door frame adjacent to the door and detecting the signal from by a detector attached to the door.

The method can include attaching a magnetic element to a door frame adjacent to the door. The method can also include measuring the magnetic field at a magnetometer attached to the door.

The method can include sensing the position of the door with an accelerometer, gyroscopic sensor, satellite positioning sensor (e.g., GPS sensor), or combinations thereof, attached to the door.

The method can include determining if a human body is visible in the second image data, then determining if the human body image enters through the door. The method can include tracking a net number of human bodies inside of a doorway defined by the door. The method can also include sending data, such as an alarm and/or event data (e.g., time, images, audio, facial recognition data, door position data, combinations thereof) to a remote processor based at least partially on when the net number of human bodies inside of the doorway exceeds a preset number, such as zero or one, for a preset amount of time.

The processor analyzing the images can be directly or indirectly attached to the door, such as in the locking device, and/or remotely positioned from the door, such as in a server or mobile device connected via a wide area network (WAN), such as the internet, to the locking device.

Further disclosed is a system for detecting a position of a door. The system can have a camera fixed to the door and a processor attached to the door.

The camera can be configured to capture a reference image data when the door is in a first position (e.g., closed). The camera can be configured to capture a second image data.

The camera can be in data communication with the processor. The processor can be configured to compare the reference image data to the second image data. The processor can be configured such that when the processor resolves that the second image data matches the reference image data within a preset matching threshold then the door is in the first position. The processor can be configured such that when the processor resolves that the second image data does not match the reference image data within a preset matching threshold then the door is in a second position (e.g., opened).

DETAILED DESCRIPTION

Figure 1B:
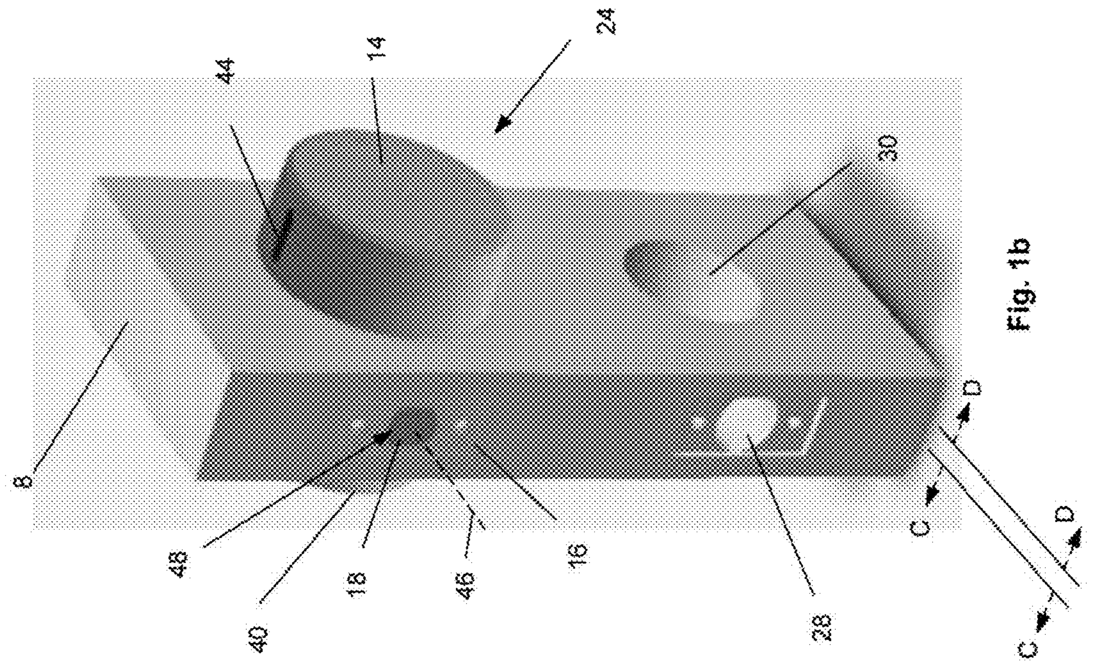
FIGS. 1*a* and 1*b* are front and rear perspective views, respectively, of a variation of the locking device mounted in a door.
Figure 1A:
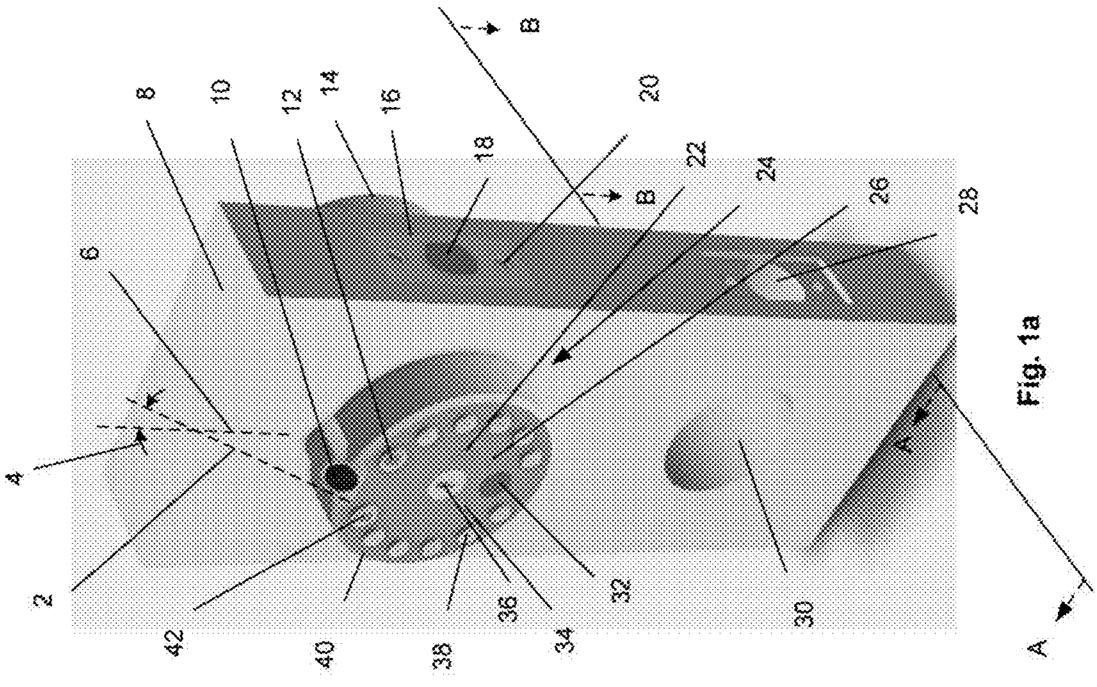
Figure 1C:
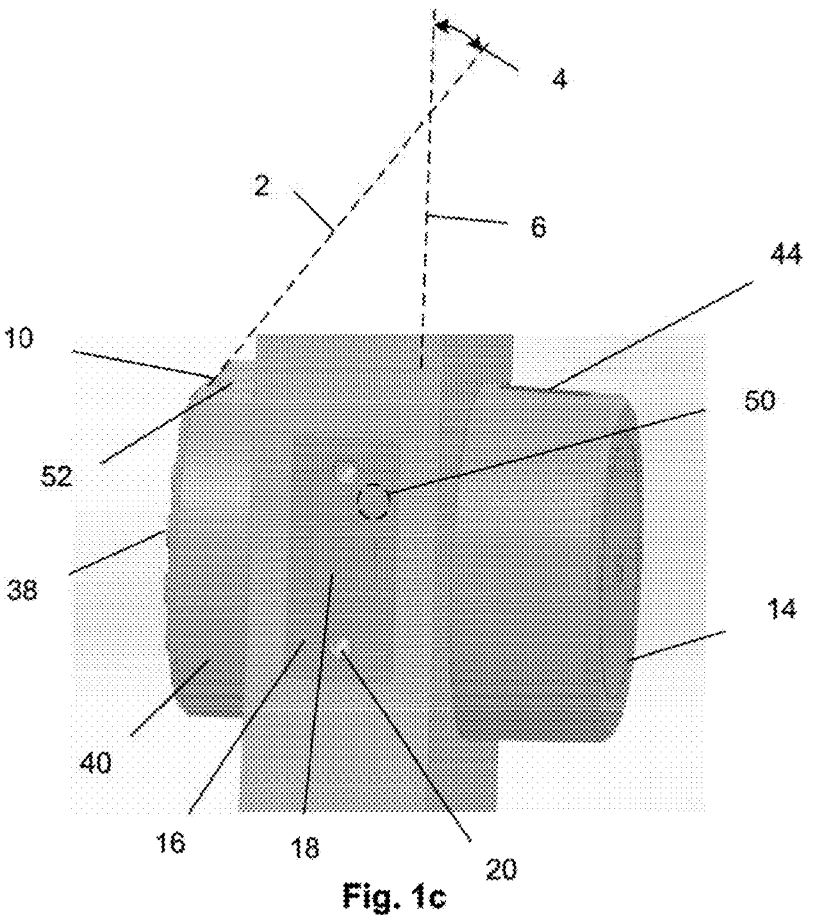
FIG. 1*c* is a side view of a variation of the locking device mounted in a door.

FIGS. 1*a* through 1*c* illustrate that a locking device 24 can be mounted in a door 8. The door 8 can be, for example, a rotating hinged door. The locking device 24 can be used to lock and unlock the door 8. The locking device 24 can be activated to lock or unlock from a remote signal triggering a motor in the locking device 24 and/or by manually turning or pressing on a control element on the locking device 24. The locking device 24 can sense the status of the lock and the position of the door 8 and report the status of the lock and the position of the door 8 to a local processor in the locking device 24 and/or a remote processor located over a wired or wireless network away from the locking device 24. For example, this data can be sent to a mobile device, such as a smartphone, and trigger the display of a notification and be fully or partially displayed in a mobile software app.

The locking device 24 can have a lock front enclosure 40 or front case. The lock front enclosure 40 can be fixed to the door 8. The rear surface of the lock front enclosure 40 can be in contact and flush with the front surface of the door 8.

The lock front enclosure 40 can have one or more buttons or switches extending through the lock front enclosure 40. For example, the lock front enclosure 40 can have a lock button 42. When depressed, the lock button 42 can send a signal to the electronics of the locking device 24 to lock the door 8. For example, the lock button 42 can activate a motor that can rotate a deadbolt 48 in the locking device 24 into a locked position.

The locking device 24 can have a camera 118. The camera 118 can be in a camera housing 52 or extension. The camera housing 52 or extension can extend from the top of the remainder of the lock front enclosure 40. The camera 118 can have a camera face 10. The camera face 10 or lens can be flush with, extend out of, or otherwise be visible through the lock front enclosure 40. The camera 118 can pan, tilt and zoom within a camera enclosure such as within a frame or enclosure inside of the camera housing 52 or extension.

The door 8 can have a door vertical axis 6. The camera face 10 can have a camera face axis 2, for example along a plane coinciding with the camera face 10. A camera face angle 4 can be the angle at which the camera face axis 2 and the door vertical axis 6 or the vertical axis intersect. The camera face angle 4 can be angled upward, for example from about 10° to about 60° from horizontal, more narrowly from about 30° to about 40°, for example about 35°.

The field of view (FOV) angle of the camera 118 can be from about 130° to about horizontally, for example about 150° horizontally, and from about 120° to about 110° vertically.

One or more numerical keys 38 or code buttons on a keypad can extend through the lock front enclosure 40. For example, the locking device 24 can have ten numerical keypad buttons, from 0 through 9, radially arranged around the front face of the locking front enclosure. The code buttons can be used, for example, to enter lock codes to unlock the deadbolt 48. The buttons on the keypad can be illuminated and/or be made from a glow-in-the-dark material.

The locking device 24 can have a doorbell 12 button extending through the lock front enclosure 40.

The locking device 24 can have a keyway 36 or key slot exposed through the lock front enclosure 40. During use a key can be inserted into the keyway 36 to unlock the door 8, for example as with a pin tumbler lock.

The locking device 24 can have a single microphone or microphone array, for example a first microphone 34 and a second microphone 26. The microphones in the microphone array can be symmetrically located on opposite lateral sides of the front of the lock front enclosure 40, for example, below the keyway 36. The microphone array can produce multiple input audio signals to use with noise cancellation and/or echo cancellation algorithms. The microphones can be behind and against microphone ports that can extend through the lock front enclosure 40.

The locking device 24 can have one or more speakers. The speakers can be behind and against one or more corresponding speaker grills 22 extending through the lock front enclosure 40. Speaker grills 22 can be symmetrically positioned on opposite lateral sides of the keyway 36.

The locking device 24 can have a motion sensor, such as an infrared (IR) motion sensor. The motion sensor can have a motion sensor face through which to receive input signals. The motion sensor face can extend through the lock front enclosure 40.

The locking device 24 can have a face plate 16 attached to the lateral side of the door. The face plate 16 can have one or more door mounting screw holes 20, for example along a mid-line symmetrically at the top and bottom of the face plate 16. Door mounting screws can be inserted through the door mounting screw holes 20 to fix the face plate 16 and locking device 24 to the door 8.

The locking device 24 can have a deadbolt 48. The deadbolt 48 can have a deadbolt distal end 18. The deadbolt distal end 18 can be coplanar with the lateral side of the door 8 when the deadbolt 48 is in an unlocked position. The deadbolt 48 can have a deadbolt longitudinal axis 46.

The locking device 24 can have a back cover or battery pack 14. The battery pack 14 can be attached to and removed from the remainder of the locking device 24 without the use of tools. The battery pack 14 can have an angle indicator 44 and/or grip. The angle indicator 44 or grip can have an indentation, a texturing (e.g., knurling), a ridge, or combinations thereof, along a radially outer surface of the battery pack 14.

The battery pack 14, shell or pod can house a rechargeable (e.g., Li-ion) battery 90. The battery pack 14 can be removed from the remainder of the locking device 24. The battery 90 can then be charged from an external power source. Then the battery back can be reattached to the remainder of the locking device 24. The battery 90 can deliver electrical power to the remainder of the locking device 24. The battery pack 14 can be attached to the remainder of the locking device 24 through corresponding magnets 58 and/or geometric features, such as ridges, snaps, clasps, hooks, or combinations thereof, in or on the battery pack 14 and/or the remainder of the locking device 24.

The door 8 can have a handle lock bore hole 30 and a handle latch port 28 extending laterally from the handle lock bore hole 30 through the lateral side of the door 8. A door handle with a latch and a secondary lock can be attached to the door 8 through the handle lock bore hole 30 and the handle latch port 28.

The face plate 16 can have one or more magnets 58 and/or magnetic sensors 50 or magnetometers 214 (as shown). The magnetic sensor 50 or magnetometer 214 can be connected to one or more microprocessors in the locking device 24 to deliver data regarding the strength of detected magnetic fields 212. The magnet 58 can be a permanent magnet and/or an electromagnet connected to one or more microprocessors in the locking device 24 to activate and create specific strength and/or a specific frequency.

Figure 2:
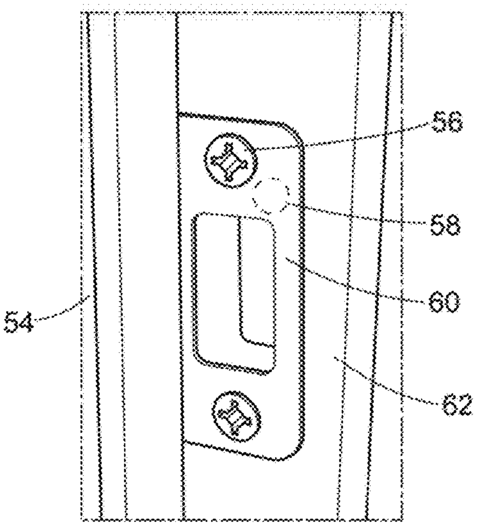
FIG. 2 illustrates a variation of a strike plate mounted in a door jamb.

FIG. 2 illustrates that a strike plate 60 can be mounted into a doorjamb 62 adjacent to a door stop 54. The strike plate 60 can be attached to the door jamb 62 with jamb mounting screws 56 driven through the door mounting screw holes 20. The strike plate 60 can have one or more magnets 58 (as shown) and/or magnetic sensors 50 or magnetometers 214. The magnet 58 and/or magnetic sensors 50 can be positioned to align longitudinally coaxially with corresponding magnetic sensors and/or magnets 58 in the face plate 16 when the door 8 is closed, for example the door 8 being pressed against the door stop 54. Corresponding magnets 58 and/or magnet sensors 50 can also be positioning in the deadbolt 48. The magnets 58 and/or magnet sensors 50 in the deadbolt 48 can detect the magnet in the strike plate 60 and/or be detected by the magnet sensor in the strike plate 60 to indicate that the deadbolt 48 has been sufficiently extended to lock the door 8.

Figure 3:
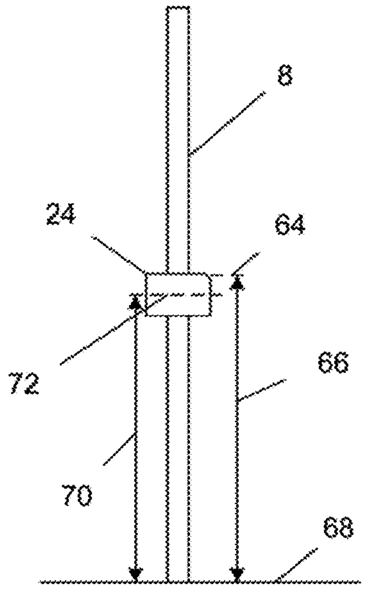
FIG. 3 shows a cross-section of a variation of the locking device mounted in the door.
Figure 4A:
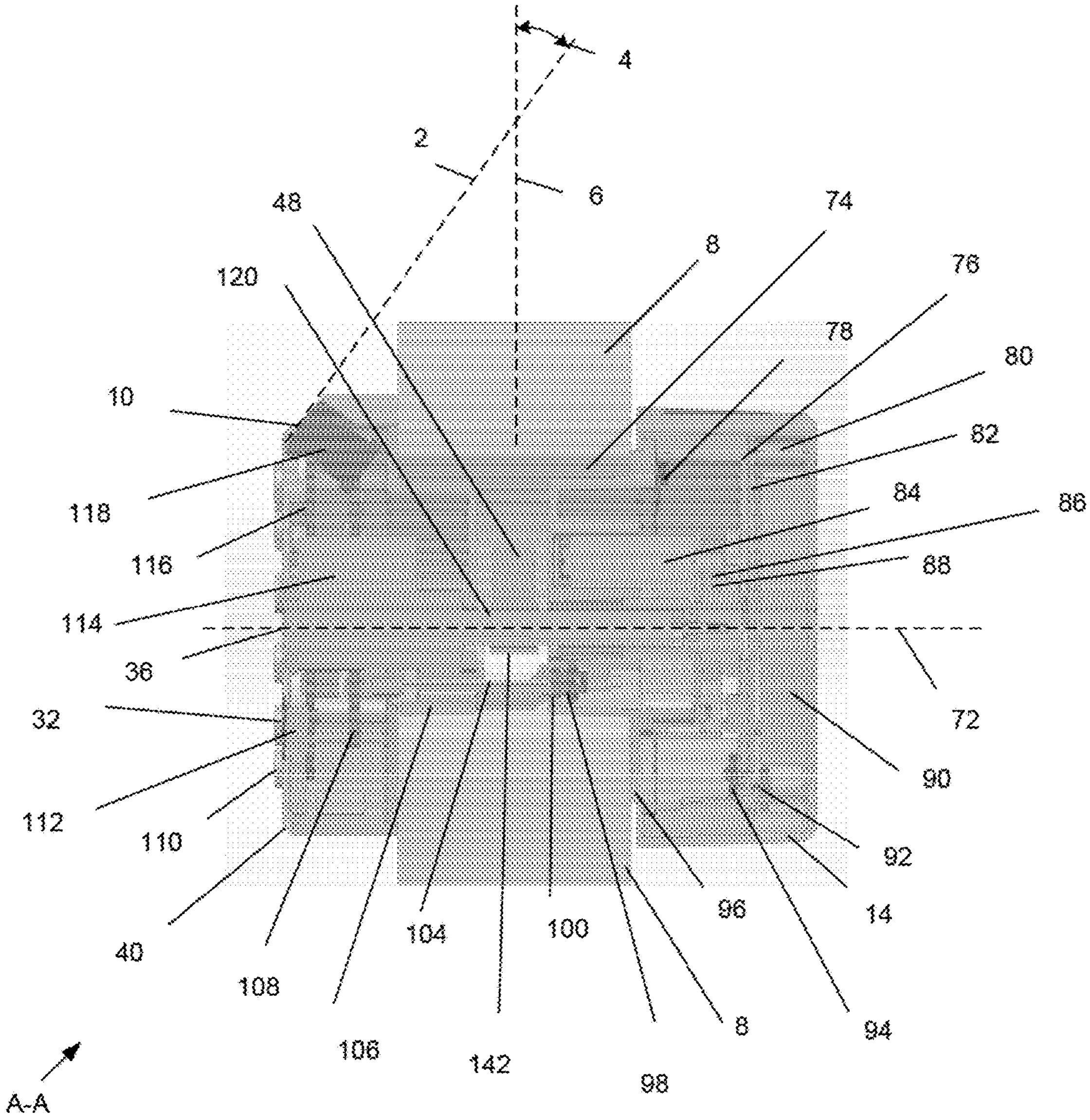
FIGS. 4*a* through 4*c* are side, front perspective, and rear perspective views, respectively, of cross-section A-A of FIG. 1*a*.
Figure 4B:
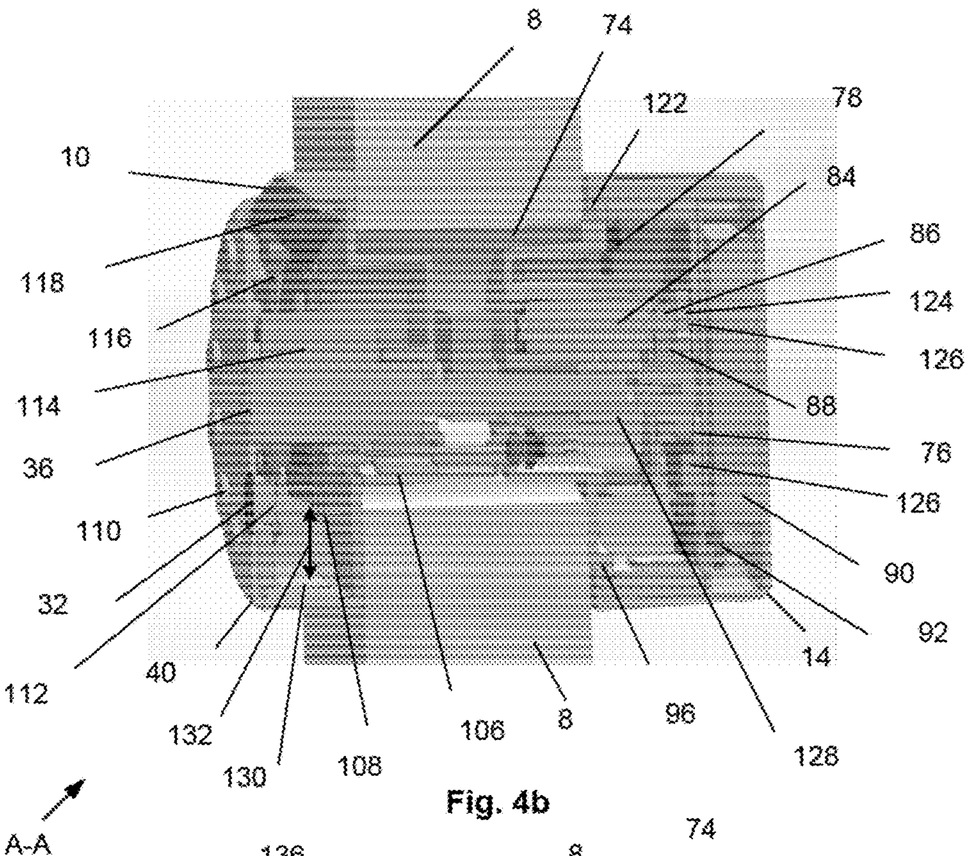
Figure 4C:
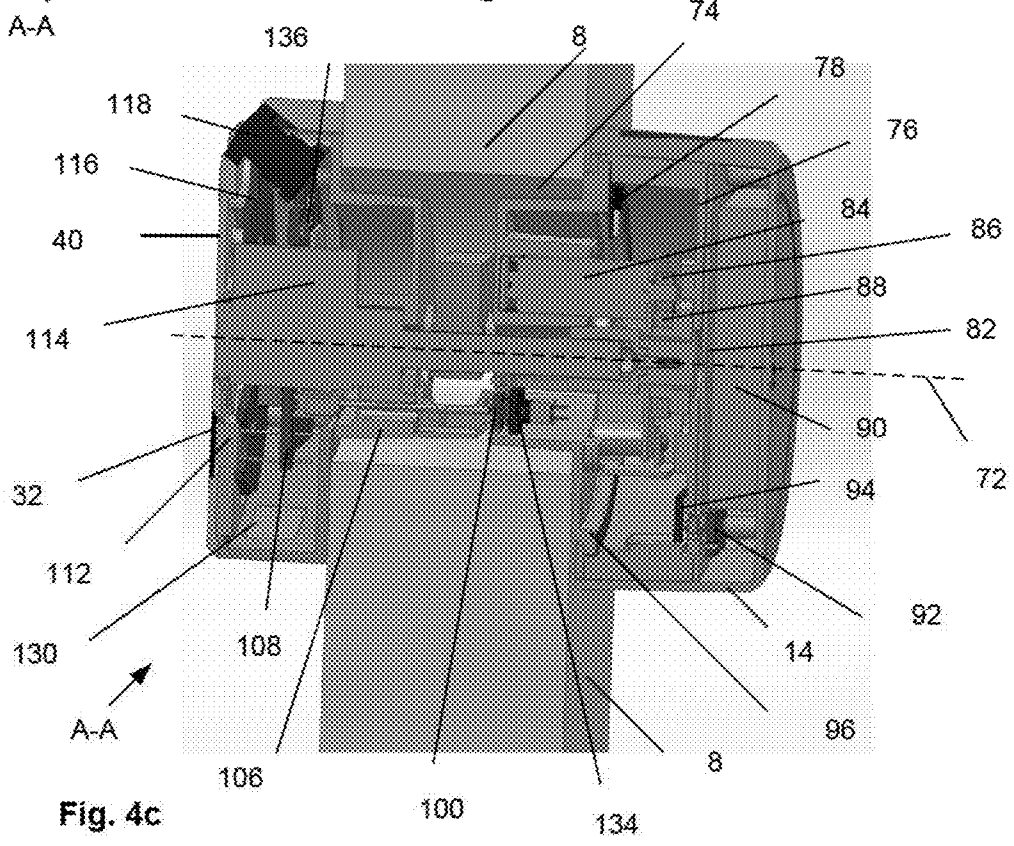

FIG. 3 illustrates that the lock longitudinal axis 72 can be at a lock height 70 from the floor 68 when the locking device 24 is mounted in the door 8. The lock height 70 can be from about 3 ft. to about 3 ft., more narrowly from about 40 in. to about 45 in.

The camera 118 can have a camera horizontal axis 64. The camera horizontal axis 64 can be at a camera height 66 from the floor 68. The camera height 66 can be from about 42 in. to about 47 in.

FIGS. 4*a* through 6*b* illustrate that the door 8 can have a deadbolt bore hole 74. The locking device 24 can extend through the deadbolt bore hole 74. The locking device 24 can clamp onto the front and back of the door 8 adjacent to the deadbolt bore hole 74. The locking device 24 can have a lock longitudinal axis 72 parallel or collinear with the central radial axis of the deadbolt bore hole 74.

A key can be inserted through the keyway 36 and rotated one direction or another to move the deadbolt 48 to extended (locked) and retracted (unlocked) positions. The keyway 36 can be in a lock cylinder 114. The lock cylinder 114 is not necessarily cylindrical in shape. A deadbolt paddle or tailpiece can extend from the lock cylinder 114.

A tailpiece receiver 140 can extend from the deadbolt 48. The tailpiece receiver 140 can have a rotating notch 142 extending through the width of the receiver. The rotating notch 142 can have a symmetric hole such as a single slot ("|") or plus-sign ("+") shape, or a non-symmetric hole such as a "D" shaped slot. During assembly of the locking device 24, the deadbolt tailpiece 120 can be slidably inserted into and through the rotating notch 142. When the key turns within the keyway 36, the lock cylinder 114 can rotate the deadbolt tailpiece 120. The deadbolt tailpiece 120 can then rotate within the rotating notch 142, extending the deadbolt 48 into a locked position or retracting the deadbolt 48 into an unlocked position.

The locking device 24 can have a first circuit board 116 and a second circuit board 108. Either or both circuit boards can have a microprocessor and/or memory 136. The circuit boards can be in data communication with the motion sensor, camera 118, keypad including the numerical keys 110, lock button 42, and doorbell 12, and combinations thereof.

The locking device 24 can have an antenna 130. The antenna 130 can be mounted flat or flush to the radially inner surface of the lateral wall of the lock front enclosure 40. For example to reduce interference and increase antenna 130 performance, an antenna gap 132 radially measured between the antenna 130 and the closest element in a radial direction with respect to the lock longitudinal axis 72 can be larger than any other radially measured gap between the inner wall of the radially inner surface of the lateral wall of the lock front enclosure 40 and the closest element.

The camera 118 can be fixed to the lock front enclosure 40 at an angle so that the camera face 10 is at the camera face angle 4. The camera 118 can be attached to the lock front enclosure 40 to form a water-tight seal (e.g., with a rubber or silicone gasket) in a port through which the camera face 10 extends. The camera 118 can longitudinally extend perpendicular relative to the surface of the camera face 10. The camera face 10 can be a lens or a protective cover over a lens. The camera 118 can be completely within the lock front enclosure 40, partially outside of the lock front enclosure 40, or completely outside of the lock front enclosure 40.

The IR motion sensor 112 can have a longitudinal axis parallel with the lock longitudinal axis 72. The IR motion sensor 112 can have an IR motion sensor face 32 coplanar with the front surface of the lock front enclosure 40. The IR motion sensor 112 can be attached to the lock front enclosure 40 to form a water-tight seal (e.g., with a rubber or silicone gasket) in a port through which the IR motion sensor face 32 extends.

Numerical keys 110 or code buttons, the lock button 42, and the doorbell 12 can be in data communication with the first and/or second circuit boards 108, for example, to transmit input data from the keys or buttons to the on-board microprocessor and/or to a remote microprocessor in wireless data communication via the antenna 130.

The locking device 24 can have a device front baseplate 106. The device front baseplate 106 can be a rigid structural frame made from metal, plastic, or combinations thereof. The device front baseplate 106 can attach to the lock front enclosure 40, circuit boards, camera 118, motion sensor, lock cylinder 114 and combinations thereof. The device front baseplate 106 and lock front enclosure 40 can define a front chamber of the locking device 24.

The locking device 24 can have a device back baseplate 96. The device back baseplate 96 can be a rigid structural frame made from metal, plastic, or combinations thereof. The device back baseplate 96 can be radially aligned and attach to the device front baseplate 106 during installation. The device back baseplate 96 can rotatably attach to a deadbolt knob 76, knob ring 122, tailpiece collar 128, and combinations thereof. The device back baseplate 96 can fixedly attach to one or more bolt position toggle switches 78, a rear mating PCB 134, a body connector 94, the case of a bolt motor 84, a gear collar 172, alignment and connection elements 138, or combinations thereof. The device back baseplate 96 and deadbolt knob 76 can define a back chamber of the locking device 24.

The first and/or second circuit boards 108 can be in data and electrical power communication with each other. A bridge connector 104 can be in data and electrical communication with the second and/or first circuit board 116. The bridge connector 104 can extend from the first and/or second circuit boards 108 rearward to a bridge connector printed circuit board (PCB). The bridge connector 104 can be accessible through a port in or extend rearward from the device front baseplate 106. The bridge connector 104 and bridge connector PCB 100 can be fixed to the device front baseplate 106.

The locking device 24 can have a rear mating connector PCB 98. The rear mating connector PCB 98 can be fixed to the device back baseplate 96. The rear mating connector PCB 98 can be in electrical and/or data communication with the motor, bolt position toggle switches 78, body connector 94, or combinations thereof.

The rear mating connector PCB 98 can be angularly and radially aligned with respect to the lock longitudinal axis 72 with the bridge connector PCB 100. The rear mating connector PCB 98 can be in electrical and data communication with the bridge connector PCB 100 when the locking device 24 is assembled and attached to a door 8. The bridge connector PCB 100 and/or the rear mating connector PCB 98 can have spring-loaded pins extending toward the opposite PCB. One or more springs can push the bridge connector PCB 100 and/or the rear mating connector PCB 98 toward the opposite PCB. During installation and assembly of the locking device 24, the rear mating connector PCB 98 and/or the bridge connector PCB 100 and/or spring-loaded pins in either the rear mating connector PCB 98 and/or bridge connector PCB 100 can translate in a direction parallel with the lock longitudinal axis 72 when the device back baseplate 96 is attached to the device front baseplate 106 through the deadbolt bore hole 74.

The deadbolt knob 76 can fixedly attach to a knob ring 122. The knob ring 122 can be a flange, rim, collar, or ring. The knob ring 122 can be on the front of the rear edge of the device back baseplate 96. The deadbolt knob 76 and knob ring 122 can rotate on the rear edge of the device back baseplate 96 about the lock longitudinal axis 72. The deadbolt knob 76 and knob ring 122 can be longitudinally fixed to the rear edge of the device back baseplate 96.

The locking device 24 can have one or more bolt position toggle switches 78. The bolt position toggle switches 78 can be in data communication with the microprocessors. The deadbolt knob 76 can have one or more hub interference projections 152 that can toggle the bolt position toggle switches 78 depending on the angular position of the deadbolt knob 76 with respect to the lock longitudinal axis 72, as described infra. Each bolt position toggle switch 78 can send a signal to the microprocessor when the respective toggle switch has been toggled by the hub interference projection 152. The microprocessor can then calculate or lookup in memory the corresponding deadbolt 48 position to sense whether the deadbolt 48 is extended in a locked position or retracted in an unlocked position.

The locking device 24 can have a bolt motor 84. The case of the bolt motor 84 can be fixed to the device back baseplate 96. The bolt motor 84 can be powered by the battery 90. The bolt motor 84 can be activated and deactivated by the microprocessor. For example, when the microprocessor receives a signal that the lock button 42 is pressed, the microprocessor can activate the motor to extend the deadbolt 48 into a locked position. When the microprocessor receives a signal from a remote device or server via the antenna 130 to lock or unlock the door 8, the microprocessor can activate the motor to move the deadbolt 48 into a locked or unlocked position.

If an input signal is received by the microprocessor to lock or unlock the deadbolt 48 and the deadbolt 48 is already in the desired position according to the signals from the on-board sensors (i.e., bolt position toggle switches 78, motor, and sensors (e.g., magnetometers 214) in the deadbolt 48, door jam or strike plate 60, or combinations thereof), the microprocessor can do nothing, reset the position of the deadbolt 48 to confirm the bolt position via the on-board sensors, activate the deadbolt 48 regardless of previously detected on-board sensor signals, or combinations thereof.

The bolt motor 84 can have a shaft extending from the case of the motor. The shaft can rotatably and translatably fixedly attach to a motor gear 86. The motor gear 86 can corotate with the motor.

The locking device 24 can have a tailpiece collar 128. The tailpiece collar 128 can be rotatably fixed to the terminal end of the deadbolt tailpiece 120. During assembly the terminal end of the deadbolt tailpiece 120 can be translatably slid into the tailpiece collar 128 in a direction collinear or parallel with the lock longitudinal axis 72. The tailpiece collar 128 can be rotatably fixed to a bolt gear 88 and one or more bolt-knob interfaces 124.

The bolt gear 88 can be rotatably and translatably fixedly attached to the tailpiece collar 128. The bolt gear 88 can be longitudinally between the rear terminal end of the tailpiece and the bolt-knob interface 124. The bolt gear 88 can corotate with the tailpiece collar 128 and/or tailpiece.

The motor gear 86 can mesh with the bolt gear 88. The motor gear 86 can drive and be driven by the bolt gear 88. The motor gear 86 and the bolt gear 88 can each rotate in either direction. The motor gear 86 and bolt gear 88 can rotate in opposite directions to each other. The bolt gear 88 can have larger (as shown), same, or smaller radius than the motor gear 86. The bolt and motor gears 86 can be spur, helical or double helical gears.

The rotational axis of the shaft of the motor can be parallel with the rotational axis of the deadbolt tailpiece 120 and tailpiece collar 128. The rotational axes of the shaft of the motor, the deadbolt tailpiece 120 and the tailpiece collar 128 can be parallel and/or collinear with the lock longitudinal axis 72.

The bolt-knob interfaces 124 can extend radially from a hub 180 at the rear terminal end of the tailpiece collar 128. The bolt-knob interfaces 124 can be a part of and/or fixedly attached to the tailpiece collar 128. The bolt-knob interfaces 124 can corotate with the tailpiece collar 128 and/or deadbolt tailpiece 120.

Knob tabs 126 can extend forward from the internal rear wall of the deadbolt knob 76. The knob taps can overlap with the bolt-knob interfaces 124 in the longitudinal direction. The knob tabs 126 can be configured to remain in contact with the bolt-knob interfaces 124. For example, the knob tabs 126 can firmly contact each angular side of at least one or all of the bolt-knob interfaces 124. Also for example, the knob tabs 126 can tightly slide inside of slots on the bolt-knob interfaces 124. When the bolt-knob interfaces 124 rotate about the axis of rotation of the tailpiece collar 128, the knob tabs 126 can rotate about the axis of rotation of the deadbolt knob 76.

When the deadbolt knob 76 is rotated, the knob tabs 126 can push the bolt-knob interfaces 124. The bolt-knob interfaces 124 can then rotate the tailpiece collar 128 about the lock longitudinal axis 72. The tailpiece collar 128 can then rotate the deadbolt tailpiece 120 which can extend or retracting the deadbolt 48. When the deadbolt 48 is rotated otherwise (e.g., by turning the key or activation of the motor), the bolt-knob interface 124 can push the knob tabs 126, and thus the deadbolt knob 76 can rotate. The deadbolt knob 76 can corotate with the deadbolt tailpiece 120. The axis of rotation of the deadbolt knob 76, tailpiece collar 128 and tailpiece, or combinations thereof, can be collinear.

The bolt gear 88 can also rotate which can rotate the motor gear 86 turning the motor. The power passively generated (i.e., via power derived from the turning of the manual deadbolt knob 76) by the motor can be detected by one or more of the microprocessors. Reception of the passively generated power by the motor can be used by the microprocessor to confirm (e.g., alone or in combination with signals from the bolt position toggle switches 78 and/or sensors (e.g., magnetometers 214) in the deadbolt 48, door jam or strike plate 60) extension or retraction of the deadbolt 48. A current spike by the activated motor, which can be detected by the microprocessor, can indicate the deadbolt 48 has reached a maximum retraction or extension position.

When the battery pack 14 is attached to the rear side of the deadbolt knob 76, the battery pack 14 can be rotatably fixed about the lock longitudinal axis 72 to the deadbolt knob 76, for example from the battery pack interference projection 190 fitting with the battery pack alignment feature 170.

The battery pack 14 can be fixedly attached to a battery cover 82 via a battery cover mount 80. The locking device 24 can have a battery 90 fixed to the front side of the rear wall of the battery pack 14. The battery 90 can be in a chamber defined by the battery cover 82 and the battery pack 14. The battery 90 can be a rechargeable battery (e.g., a NiCd, NiMH, lead acid, or Li-ion battery). The battery pack 14 can be detached from the deadbolt knob 76, recharged, and then reattached to the deadbolt knob 76.

The battery 90 can be electrically connected with a battery connector 92. The battery connector 92 can be in the chamber defined by the battery cover 82 and the battery pack 14. The battery connector 92 can be accessed through the battery cover 82. For example, the battery connector 92 can have spring-loaded pins that can extend to or through a port in the battery cover 82.

The locking device 24 can have a body connector 94 attached to the front side of the rear wall of the deadbolt knob 76. The body connector 94 can be accessible through the rear wall of the deadbolt knob 76. For example, the body connector 94 can have spring-loaded pins that can extend to or through a port in the rear wall of the deadbolt knob 76.

The body connector 94 can be electrically connected with the first and/or second circuit boards 108 via the rear mating PCB 134 and bridge connector PCB 100, the remaining electrical components in the locking device 24, or combinations thereof. For example, the body connector 94 can be electrically connected directly to the rear mating PCB 134. Current from the battery 90 can be routed to the circuit boards. The microprocessors can then control current to the electrical components (e.g., IR motion sensor 112, camera 118, bolt motor 84, bolt position toggle switches 78, microphones, speakers, the keypad, the antenna 130, either circuit board and/or components on either circuit board, one or more magnetometers 214, or combinations thereof).

The body connector 94 can angularly and radially align with the battery connector 92 with respect to the lock longitudinal axis 72. When the battery pack 14 is attached to the deadbolt knob 76, the body connector 94 can be in electrical communication with the battery connector 92, for example via spring-loaded pins on the battery connector 92 and/or body connector 94.

Figure 5:
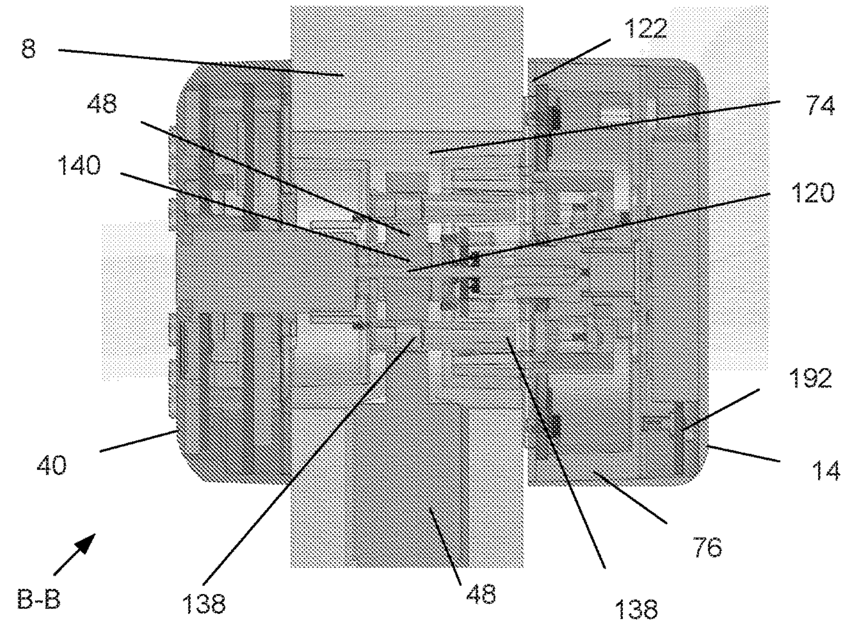
FIG. 5 is a variation of cross-section B-B of FIG. 1*a*.
Figure 6A:
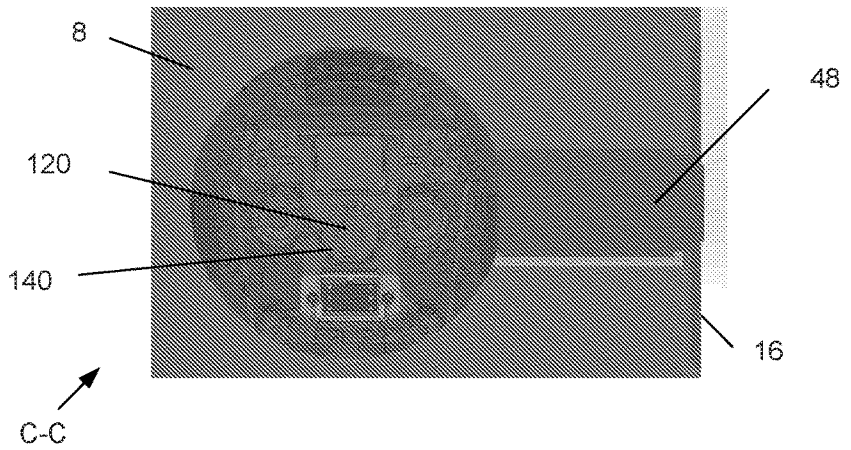
FIG. 6*a* is a variation of cross-section C-C of FIG. 1*b*.
Figure 6B:
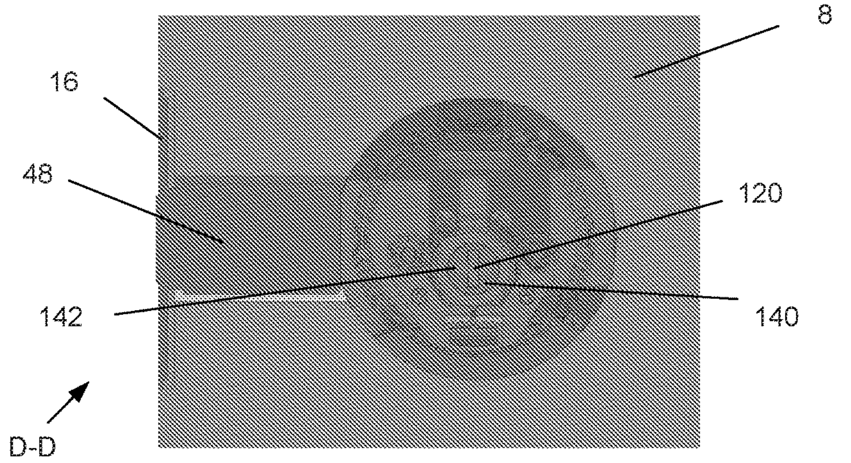
FIG. 6*b* is a variation of cross-section D-D of FIG. 1*b*.

FIG. 5 illustrates that the device front baseplate 106 and the device back baseplate 96 can have alignment and connection elements 138. The alignment and connection elements 138 can radially and angularly align the device front baseplate 106 and the device back baseplate 96 with each other during and after assembly and mounting on the door 8. The alignment and connection elements 138 can be cones on each of the device front baseplate 106 and the device back baseplate 96 seated in each other when the device front baseplate 106 is attached to the device back baseplate 96. The alignment and connection elements 138 can include permanent fixation elements (e.g., screws, rivets, brads) not accessible from the lock front enclosure 40.

Figure 7A:
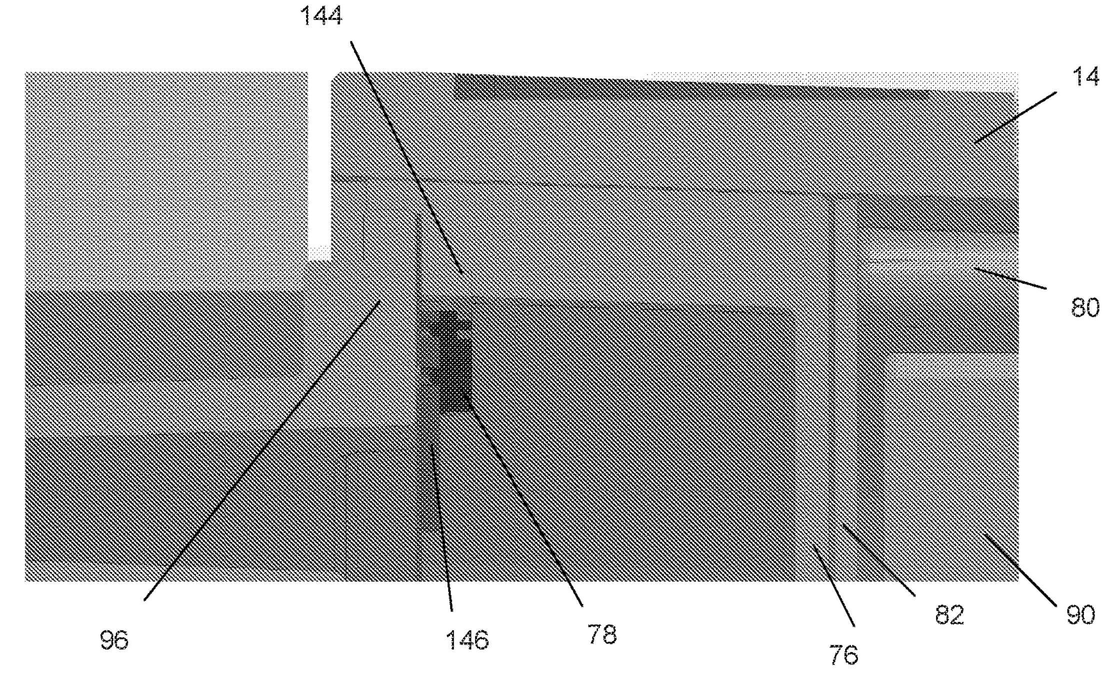
FIGS. 7*a* and 7*b* are side and rear perspective views, respectively, of a close-up of cross-section A-A.
Figure 7B:
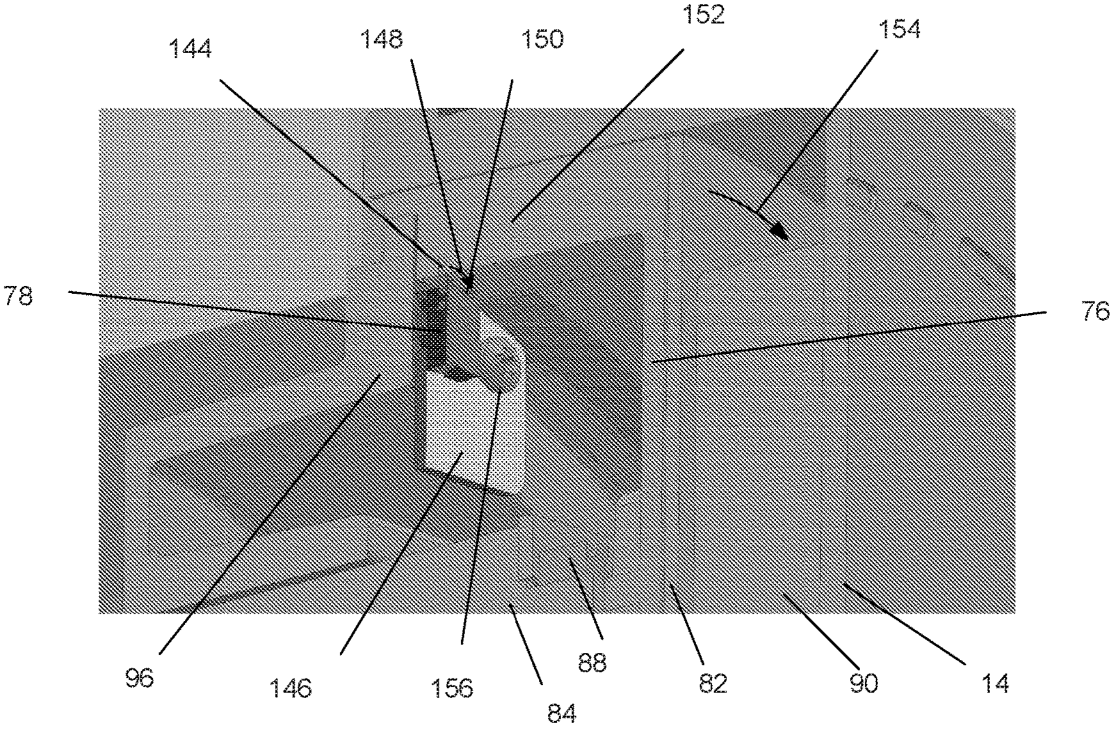

FIGS. 7*a* and 7*b* illustrate that the deadbolt knob 76 can have a radially inwardly extending hub interference projection 152. The locking device 24 can have a bolt position toggle switch 78. The bolt position switch can be mounted to a switch circuit board 146. The switch circuit board 146 can send the signal of the bolt position switch to the microprocessor. The bolt position toggle switch 78 can have a toggle tab 160 extending radially outwardly.

The toggle tab 160 can be spring-loaded or an elastic material. When an angular force is applied to the toggle tab 160, the toggle tab 160 can rotate from an unbiased (i.e., a toggle tab first position 144) to a biased (i.e., a toggle tab second position 150) position with respect to the rest of the bolt position toggle switch 78. When the toggle tab 160 is in the toggle tab second position 150, the bolt position toggle switch 78 can signal to the microprocessor that the deadbolt knob 76 has rotated to the position of the specific bolt position toggle switch 78.

The switch circuit board 146 can be attached to the device back baseplate 96 by a switch mounting screw 156 through the switch circuit board 146.

The deadbolt knob 76 can be rotated around the lock longitudinal axis 72, as shown by deadbolt knob 76 rotation arrow 154.

As the deadbolt knob 76 rotates, the hub interference projection 152 can push into the toggle tab 160. As the 1 mb interference projection 152 passes by the toggle tab 160, the hub interference projection 152 can push the toggle tab 160 from an unbiased toggle tab first position 144 to a biased toggle tab second position 150, as shown by tab rotation arrow 148.

Figure 8A:
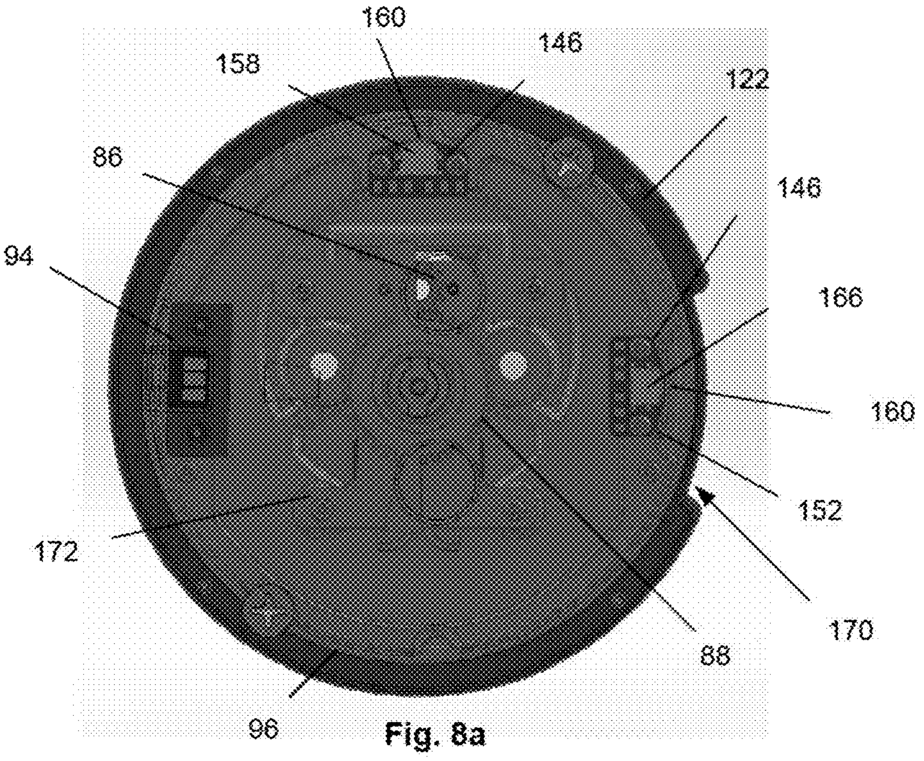
FIGS. 8*a* and 8*b* illustrate a view of the rear interior of a variation of the locking device in first and second rotated configurations, respectively.
Figure 8B:
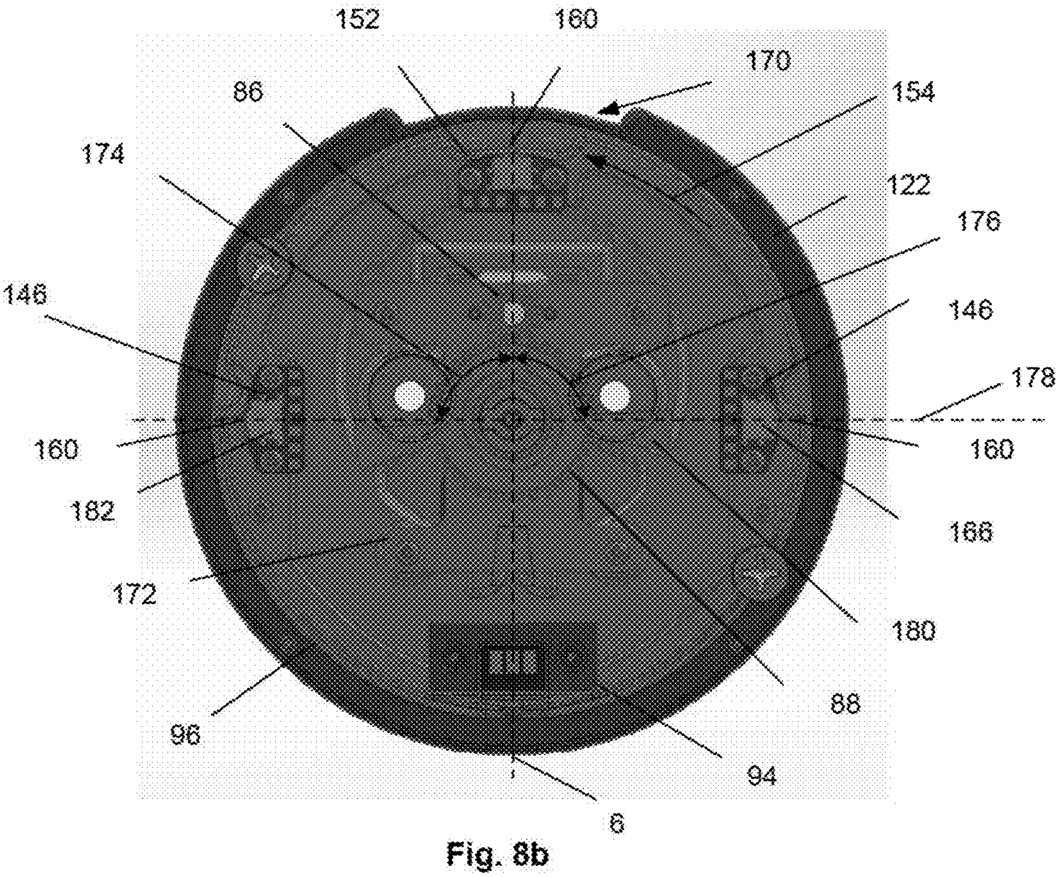

FIGS. 8*a* and 8*b* illustrate that the locking device 24 can have a bolt position first toggle switch 182 at the left (of the figure as it appears, i.e., 90° counter-clockwise from the top of the figure or door vertical axis 6), a bolt position second toggle switch 158 at the top (of the figure as it appears or door vertical axis 6), a bolt position third toggle switch 166 (of the figure as it appears, i.e., 90° clockwise from the top of the figure or door vertical axis 6), or combinations thereof.

FIG. 8*a* illustrates that when the deadbolt knob 76 is in an opened position, rotated so that the hub interference projection 152 is on the right (i.e., 90° clockwise from the top of the figure or door vertical axis 6), the hub interference projection 152 can rotate the toggle tab 160 on the bolt position third toggle switch 166. The bolt position third toggle switch 166 can send a signal to the microprocessor that the bolt position third toggle switch 166 is triggered. The microprocessor can calculate (e.g., looking up in memory) that the bolt position third toggle switch 166 is triggered when the deadbolt 48 is in a locked position extending out of the door 8.

The hub interference projection 152 and the battery pack alignment feature 170 can be co-angular (as shown) or at different angles on the deadbolt knob 76 with respect to each other.

FIG. 8*b* illustrates that when the deadbolt knob 76 is rotated, as shown by the deadbolt knob 76 rotation 154, so that the hub interference projection 152 is at the top (of the figure as it appears or door vertical axis 6).

The locking device 24 can have a bolt transverse axis 178. The locking device 24 can be installed in a right-handed or a left-handed configuration on the door 8 (e.g., depending on which side of the door the exterior or front side of the handle faces). For the right-handed configuration, the hub interference projection 152 can rotate within the right-hand separation angle 174. The right-hand separation angle 174 can be between the bolt position third toggle switch 166 when locked and the bolt position second toggle switch 158 when unlocked. For the left-handed configuration, the hub interference projection 152 can rotate within the left-hand separation angle 176. The left-hand separation angle 176 can be between the bolt position first toggle switch 182 when locked and the bolt position second toggle switch 158 when unlocked.

Figure 9:
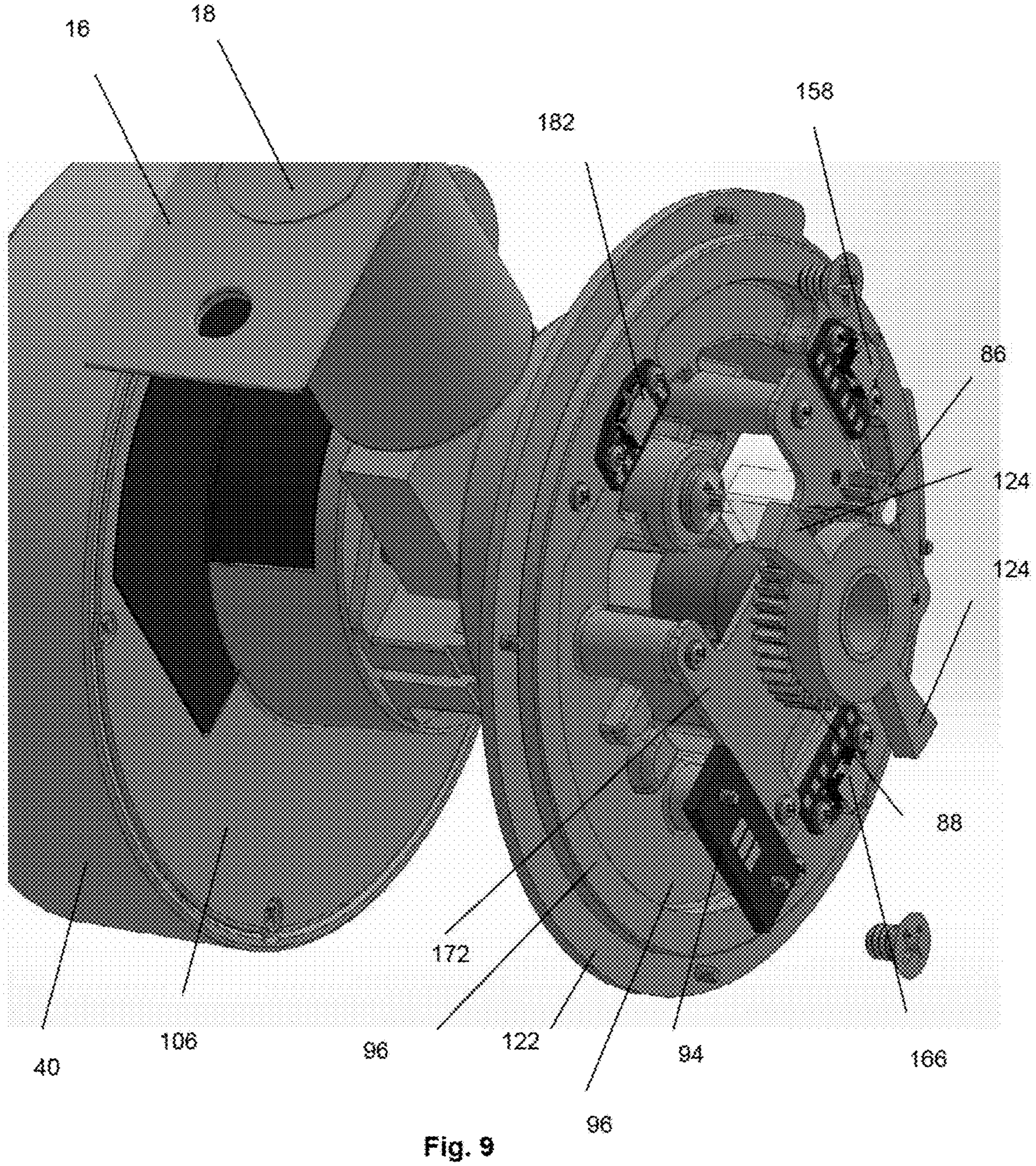
FIG. 9 is a view of a close-up of the rear interior of a variation of the locking device with some elements not shown for illustrative purposes.

FIG. 9 illustrates that the motor gear 86 meshes with the bolt gear 88. When the bolt motor 84 activates, the motor gear 86 can rotate. The motor gear 86 can deliver torque from the bolt motor 84 to the bolt gear 88. When the bolt gear 88 is rotated, the deadbolt 48 is extended or retracted depending on the direction of rotation.

The microprocessor can sense when the deadbolt 48 is in a locked position, for example based on receiving a signal from the appropriate bolt position toggle switch 78. When the deadbolt 48 is in a locked position and the microprocessor receives a command to unlock the door 8 (e.g., from a wirelessly received signal or an unlock code entered through the code buttons), the microprocessor can activate the bolt motor 84 in the direction to unlock the door 8. When the appropriate bolt position toggle switch 78 that indicates that the deadbolt 48 is in an unlocked position sends a signal to the microprocessor that the toggle tab 160 on the respective switch has been activated, the microprocessor can deactivate the motor, stopping rotation of the deadbolt 48. In combination or in lieu of signals from the bolt position toggle switches 78, the microprocessor can receive signals from a magnetometer 214 or magnet 58 in the deadbolt 48 and/or door jam or strike plate 60 indicating the position of the deadbolt 48 with respect to the door jam or strike plate 60.

The locking device 24 can have a gear collar 172. The gear collar 172 can be fixed to the device back baseplate 96. The gear collar 172 can have ports through which the bolt motor 84 shaft and the tailpiece collar 128 can extend. The motor gear 86 and the bolt gear 88 can be adjacent to the rear side of the gear collar 172.

(Toggle tabs 160 shown in FIGS. 8*a*, 8*b* and 9 illustrate toggle tabs 160 in three concurrent states of deflection for illustrative purposes.)

Figure 10:
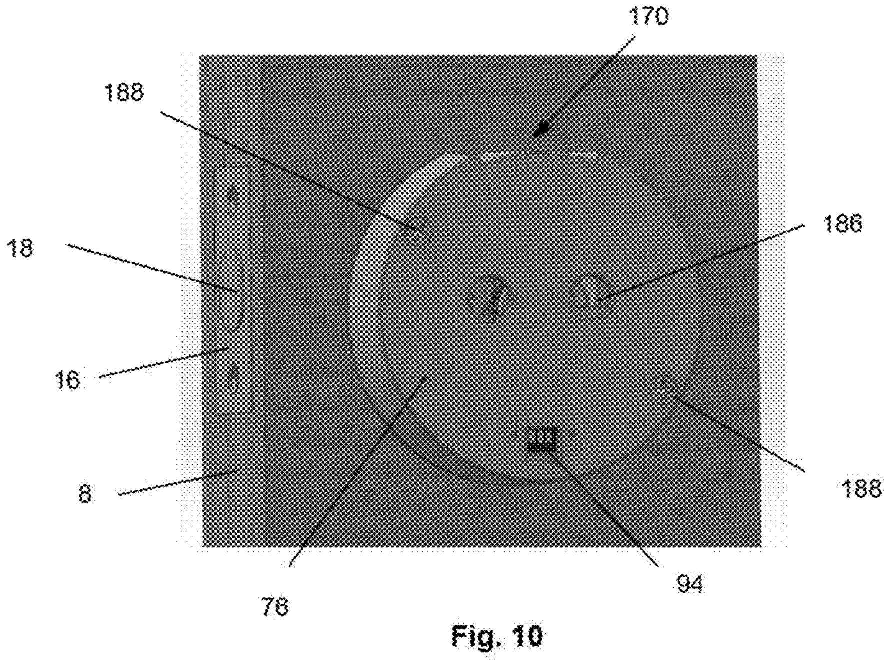
FIG. 10 is a rear perspective view of a variation of the locking device mounted in a door with the back cover removed.

FIG. 10 illustrates that the deadbolt knob 76 can be fixed to the remainder of the locking device 24, other than the battery pack 14, by knob screws 188. The knob screws 188 can be magnetic, such as permanent magnets or electromagnets. The knob screws 188 can be elements other than screws, such as other embedded or adhesive magnetic discs or cylinders. The battery back can be made from a magnetic material such as a ferrous material, for example ferritic stainless steel, and/or the battery pack 14 can have one or more magnetic elements corresponding in angular position to the knob screws 188 when the battery pack 14 is mounted on the deadbolt knob 76 when the battery pack alignment feature 170 receives the battery pack interference projection 190. The knob screws 188 can magnetically couple with the battery pack 14 material and/or with the magnetic elements in or on the battery pack 14, for example, holding the battery pack 14 to the deadbolt knob 76.

The deadbolt knob 76 can extend rearward from the door 8. When the deadbolt 48 is in an unlocked position retracted into the door 8, the battery pack alignment feature 170 can be pointed toward the top of the locking device 24. The body connector 94 can be visible and directly accessed through the deadbolt knob 76.

Rotation of the deadbolt knob 76 in a first direction can extend the deadbolt 48 out of the door 8 into a locked position. Rotation of the deadbolt knob 76 in a second direction opposite the first direction can retract the deadbolt 48 into the door 8 and an unlocked position. The deadbolt knob 76 can be rotated directly or via the battery pack 14 when the battery pack 14 is on the deadbolt knob 76.

The deadbolt knob 76 can have knob ports 186. During assembly, a tool, such as a screwdriver, can be inserted through the knob ports 186 to insert and activate, fasten or tighten attachment elements such as screws, that can attach internal elements, such as the device front baseplate 106 to the device back baseplate 96.

Figure 11A:
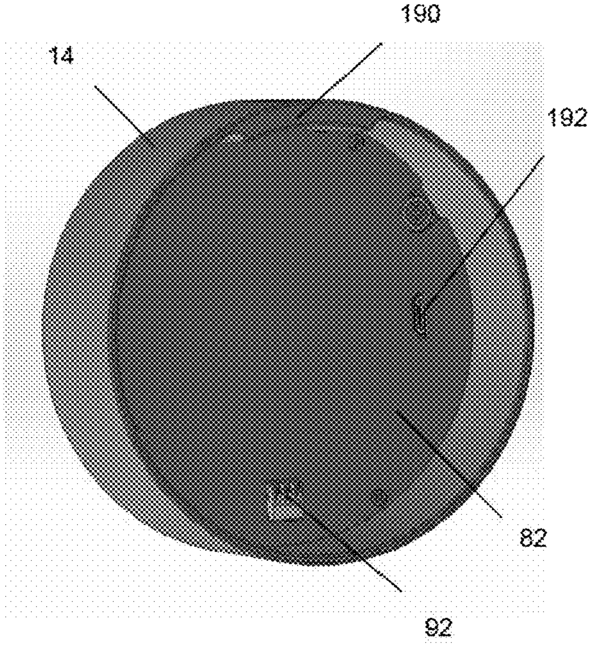
FIGS. 11*a* and 11*b* are front and rear views, respectively, of a variation of the back cover.
Figure 11B:
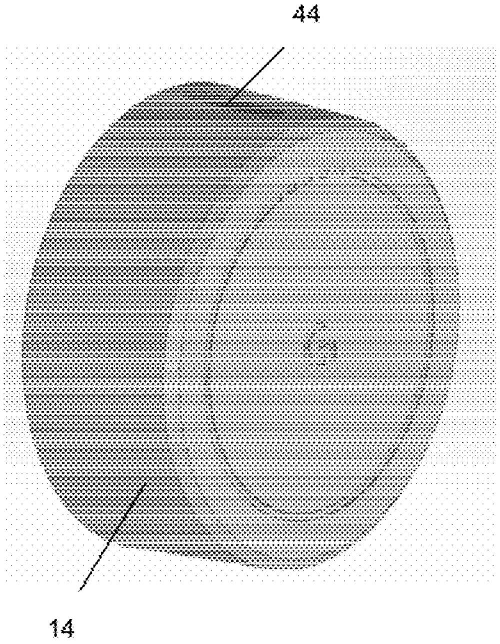

FIGS. 11*a* and 11*b* illustrate that the battery pack 14 can have a battery pack interference projection 190 extending radially inward from the lateral wall of the battery pack 14. The battery pack interference projection 190 can be angularly aligned with the angle indicator 44. The battery pack interference projection 190 can be shaped and sized to slide in and out of the battery pack alignment feature 170 in the direction of the lock longitudinal axis 72 when the battery pack 14 is pushed onto the deadbolt knob 76.

The battery pack interference projection 190 can be shaped and sized to interference fit against the battery pack alignment feature 170 in an angular direction when the battery pack 14 is rotated about the lock longitudinal axis 72. The battery pack 14 can snap fit and/or pressure fit onto the deadbolt knob 76.

The battery pack 14 can have a charging port 192 in electrical communication with the battery 90. The charging port 192 can extend and be accessible through the battery cover 82. The charging port 192 can be a USB connector. An external power source can be plugged into the charging port 192 to charge the battery 90.

The battery connector 92 can extend and be accessible through the battery cover 82. The battery connector 92 can have spring-loaded pins (for example three pins as shown). The battery connector 92 can electrically connect with the body connector 94 and delivery electrical power from the battery 90 in the battery pack 14 through the battery connector 92 and body connector 94 to the remainder of the electronic elements in the locking device 24.

The deadbolt knob 76 can have a power socket, suck as a USB connector, that can receive a plug from an alternate power source (i.e., other than the battery pack 14). For example, when the battery pack 14 is removed for recharging, the alternate power source can be plugged into the power socket to deliver electrical power to the locking device 24, for example, without the battery pack 14. The alternate power source can be unplugged from the power socket before the battery pack 14 is reattached to the locking device 24 after charging.

The locking device 24 can have an on-board backup battery that can be activated when the battery pack 14 is removed from the remainder of the locking device 24 (e.g., for recharging).

Figure 12:
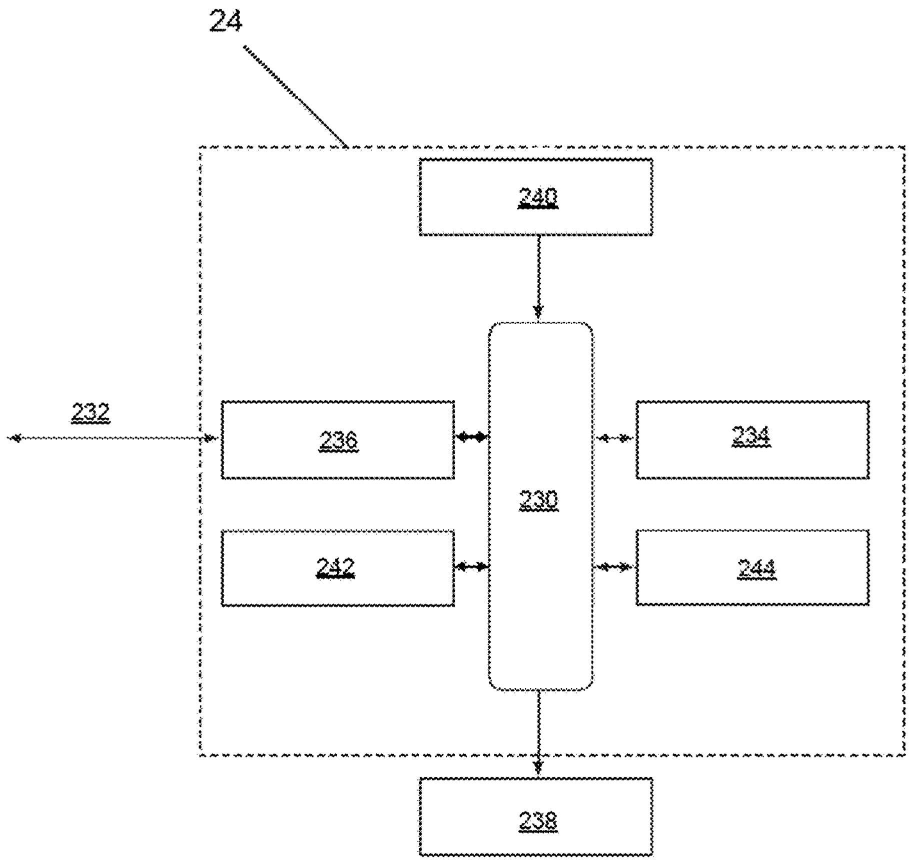
FIG. 12 is a schematic diagram of a variation of data components of the locking system.

FIG. 12 illustrates a schematic diagram of a variation of data components of the locking system 194.

The locking device 24 can have a bus 230, for example on board the first and/or second circuit board 108. The locking device 24 can have one or more on-board input/output (I/O) devices, such as the keypad. The locking device 24 can have a network adapter 236 such as a modem on the first and/or second circuit board 108 in communication with the antenna 130. The network adapter 236 can create communication links 232 with remote devices. The locking device 24 can have one or more processors 242 (also referred to herein as microprocessors). The locking device 24 can have first 234 and second 244 memories, for example on the first and/or second circuit boards 108.

The network adapter 236, processor 242, first and second memories and off-board I/O devices 238 can be in direct two-way data communication directly with the bus 230. The on-board I/O devices 240 can be in one-way data communication to the bus 230. The off-board I/O devices 238 can be in one-way data communication from the bus 230.

Figure 13:
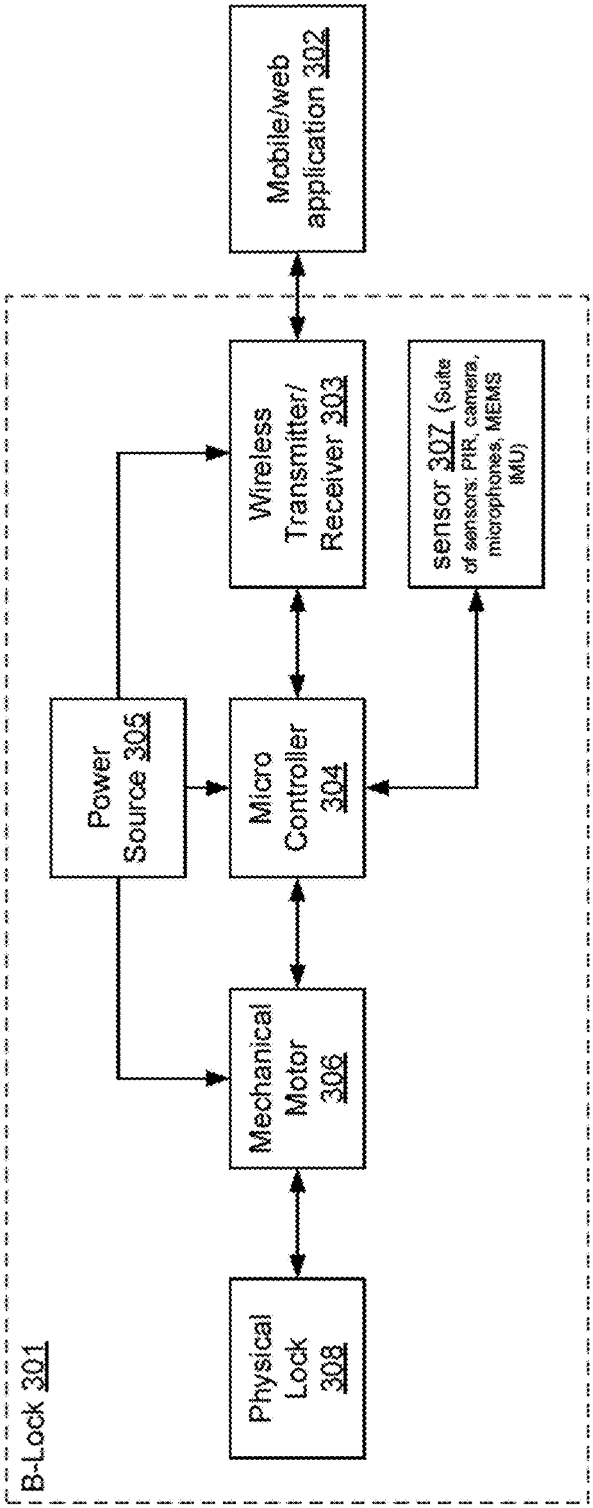
FIG. 13 is a block diagram illustrating a variation of an electronic lock that includes a personal data device.

FIG. 13 is a block diagram illustrating an embodiment of an electronic lock that includes a personal data device, consistent with various embodiments. The locking device 24 or biometric lock can have the physical lock (e.g., the lock cylinder 114, deadbolt tailpiece 120, and deadbolt 48), power source (e.g., battery), mechanical motor (e.g., bolt motor 84), micro controller (e.g., microprocessor), sensor (e.g., IR motion sensor 112, camera 118, PIR, microphones, MEMS, IMU), wireless transmitter receiver (e.g., wireless modem and antenna), or combinations thereof.

In some embodiments, the electronic lock is a biometric lock, and the personal data device is a biometric scanner, with which a user can input personal data, such as biometric data of a biometrically identifiable part of his body. In other embodiments, the electronic lock is a password lock, and the personal data device is a keypad, touchpad, microphone, etc., with which a user can input personal data, such as a password or pass phrase. In yet other embodiments, the electronic lock is a voice recognition lock, and the personal data device is a microphone into which a user can provide personal data, such as a sample of his voice. In some embodiments, personal data is identifying information that can be used to establish an identify of an individual. While the following discussion involves a biometric lock, much of the discussion is applicable to other types of electronic locks, such as a password lock or a voice recognition lock, among others.

Biometric lock 301 can include physical lock 308. As will be appreciated by a person of ordinary skill in the art, physical lock 308 includes some components that are similar to those of a standard lock for a particular application. For example, a biometric lock for a particular application of locking a door 8 of a building can include some components similar to those of a standard lock to lock a door 8 of a building. The components can include, for example, a dead bolt, mechanical parts to cause the dead bolt to move and lock/unlock a door 8, a key hole/cylinder into which a key can be inserted to lock/unlock a door 8, etc.

As a second example, a biometric lock for a particular application of locking a door 8 of a safe can include some components similar to those of a standard lock to lock a door 8 of a safe. The components can include, for example, a combination or security code entry mechanism, multiple dead bolts, each of which extend from the door 8 and enter the door frame 202 of the safe to secure the safe door, mechanical parts to cause the dead bolts to move and lock/unlock the safe door, etc. As a third example, a biometric lock for a particular application of locking a door 8 of a car can include some components similar to those of a standard lock to lock a door of a car. The components can include, for example, a latch to latch the car door closed, a key hole/cylinder into which a key can be inserted to lock/unlock the car door, a wireless receiver and a processing unit to receive a wireless signal (that includes a security code), to validate the security code, and to unlock/lock the car door upon validation of the security code, etc.

Various embodiments of biometric lock 301 can be used to lock any of various doors, such as a door on a building, a door on a car, a door on a safe, a door on a cabinet, etc. Biometric lock 301 can be unlocked and/or locked based on validation of biometric data, which is obtained by biometric data device 307. Biometric data device 307 is a device that can obtain data of a biometrically identifiable object where the data can be used to identify the biometrically identifiable object. Examples of biometrically identifiable objects include a finger, a hand, an iris, a face, etc. Examples of biometric data devices include a fingerprint scanner, a hand scanner, an iris scanner, a face scanner, a camera 118, etc. In some embodiments, biometric data device 307 is not integrated in a biometric lock, but rather is integrated in or coupled to a mobile device, such as a mobile device that is executing mobile/web application 302.

Biometric data device 307, which is a personal data device, can obtain biometric data of a user, and can send the biometric data to microcontroller 304. Microcontroller 304 can have a local memory that stores various information, such as security keys, biometric information, access details, logs of user interaction, associated usage timestamps, etc. Microcontroller 304 can keep a record of owner and/or administrator information for biometric lock 301. In some embodiments, each biometric lock has a single registered owner. In some of these embodiments, in addition to having a single registered owner, each biometric lock can have one or more administrators. An owner can authorize a user to be an administrator. Both owners and administrators can authorize a user to be able to unlock/lock a biometric lock.

When a new user indicates a request to open biometric lock 301 by scanning his fingerprint using biometric data device 307, the request is sent to microcontroller 304.

Microcontroller 304 compares biometric data obtained by biometric data device 307 from the new user against registered user data that is stored in local memory, which can be non-volatile memory. If the biometric data matches a registered user that is authorized to open biometric lock 301, microcontroller 304 signals mechanical motor 306 to actuate the deadbolt 48 of physical lock 308 in order to open biometric lock 301.

Power source 305 provides power to biometric lock 301, and can operate on a battery energy source, a wired power outlet, etc. For example, power source 305 can be a rechargeable battery.

Biometric lock 301 can include light emitting diodes (LEDs), a display, etc. to indicate the lock/unlock status of biometric lock 301 to users. Physical lock 308 can include a knob for manually locking/unlocking biometric lock 301 that is accessible from the inside of the door 8 on which biometric lock 301 is mounted. Physical lock 308 can also include a key hole/cylinder that is accessible from the outside of the door 8 on which biometric lock 301 is mounted, and into which a user can insert a physical key to lock/unlock biometric lock 301.

In various embodiments, wireless transmitter/receiver 303 can communicate via any of various technologies, such as a cellular network, a short-range wireless network a wireless local area network (WLAN), etc. The cellular network can be any of various types, such as code division multiple access (CDMA), time division multiple access (TDMA), global system for mobile communications (GSM), long term evolution (LTE), 3G, 4G, etc. The short-range wireless network can also be any of various types, such as Bluetooth, Bluetooth low energy (BLE), near field communication (NFC), etc. The WLAN can similarly be any of various types, such as the various types of IEEE 802.11 networks, among others. In some embodiments, wireless transmitter/receiver 303 can also or alternately communicate via a wired connection, such as via internet protocol (IP) messages sent over a wired Ethernet network. In some embodiments, wireless transmitter/receiver 303 can communicate with a server.

Microcontroller 304 can maintain a log of entries and exits and can send the log information via wireless communication facilitated by wireless transmitter/receiver 303 to, for example, a biometric lock application running on a mobile device, such as mobile/web application 302. Microcontroller 304 can log when a user opens biometric lock 301 with a physical key, and can share this log information with the lock owner and/or administrator(s). Logs of biometric lock 301 being locked and/or unlocked through the use of a physical key can, for example, inform the owner of events such as unauthorized access into a space (e.g., a burglary). In some embodiments, a voltage output of mechanical motor 306 is monitored by a circuit of biometric lock 301 in order to sense when physical lock 308 is manually locked and/or unlocked using a physical key. In some embodiments, a capacitive/optical sensor of biometric lock 301 can track the opening and closing of the door 8. Biometric lock 301 can be equipped with other sensors that track vibrations, temperature, etc. Biometric lock 301 can also be equipped with a display, touch sensors, and/or a camera 118 to enable communication to and/or from users.

In some embodiments, biometric data device 307 can communicate with both microcontroller 304 and mobile/web application 302. Mobile/web application 302 can be a mobile or a web application that runs on, for example, a mobile device. Biometric data device 307 may be not part of biometric lock 301, but rather part of or coupled to a mobile device. A biometric data device can be part of or coupled to a mobile device executing a mobile/web application which can be executed on a mobile device. Biometric data device 307, rather than microcontroller 304, can validate the biometric data, such as by comparing the biometric data to stored biometric data of users that are authorized to unlock/lock biometric lock 301. The stored biometric data can be stored, for example, in a database. The stored biometric data can reside locally on microcontroller 304, can reside on biometric data device 307, or can reside at another location that is accessible via wireless transmitter/receiver 303. If a user is verified as being authorized to lock/unlock biometric lock 301 at the time of the verification, biometric lock 301 will lock or unlock the door/gate on which biometric lock 301 is mounted.

Mobile/web application 302 can help users of biometric lock 301 to organize and manage access to a protected resource, such as a house, a car, a safe, etc. The log information can help inform the owners and/or administrators how the resource is accessed. Biometric lock 301 can also be applied to an object which has a lock mechanism, but not a door for restricting access to the object, such as a computer or a boat. For example, biometric lock 301 can be used as a lock mechanism for the computer or the boat. An owner and/or administrator of biometric lock 301 can utilize mobile/web application 302 to authorize an individual to be able to lock/unlock biometric lock 301 for any period of time.

Figure 14:
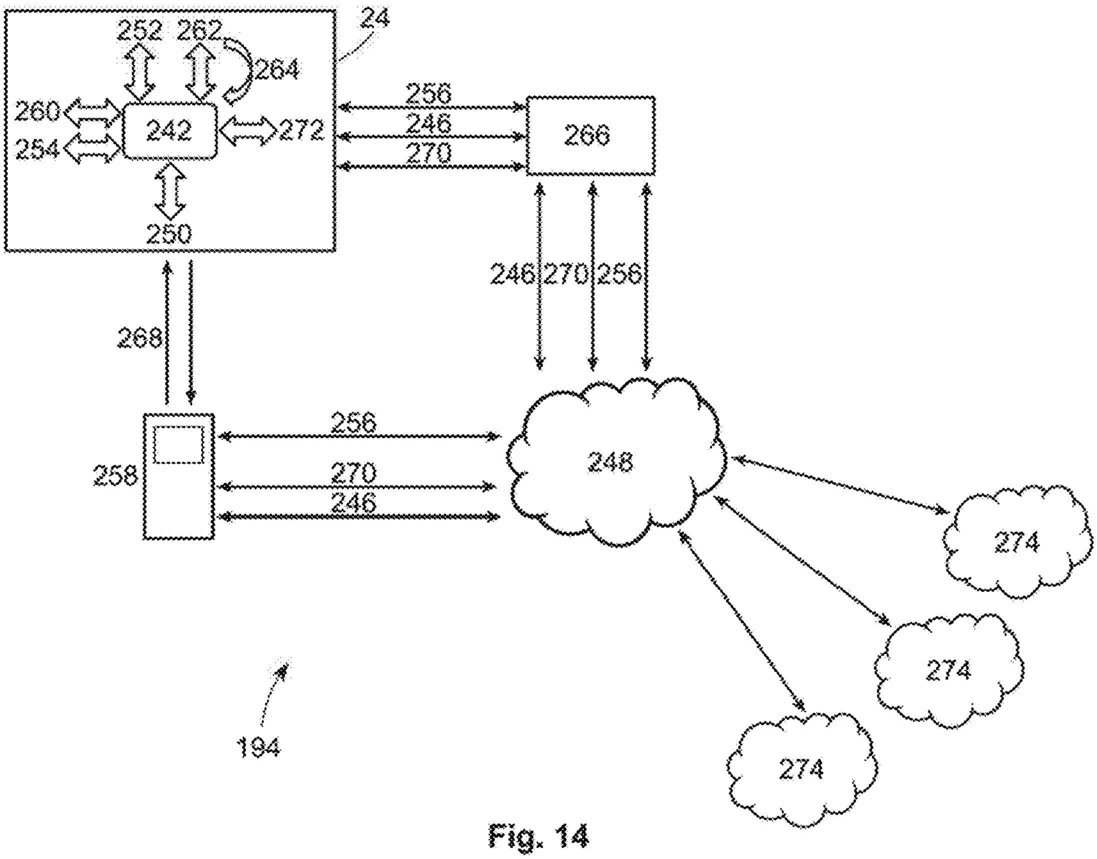
FIG. 14 is a schematic diagram of a variation of data transfers between components of the locking system.

FIG. 14 illustrates a schematic diagram of a variation of data transfers between components of the locking system 194.

The microprocessor 242 (or processor) on-board the locking device 24 can send and receive data to and from the motion sensor 260, keypad, camera 118, audio microphone data 254, motor force 264 (e.g., torque or current), motor 262 and deadbolt position sensor data, and combinations thereof. The processor 242 can also activate the motor 262 and buttons 252. The processor 242 can send the received data 256, including status, audio 246 and video 270 information, via WiFi 272 for example, to a LAN router 266, and/or via Bluetooth LE 250 for example, to a mobile device 258 running an app. The processor can receive data such as audio and status information from the router and/or the mobile device. The mobile device can also send an SSID/password 268 to the microprocessor to signal the microprocessor to open the door 8.

The router 266 and/or mobile device 258 can communicate the data received from the processor 242 to backend servers 248 and receive data such as audio 246 and status 256 information from the backend servers 248 to send to the processor 242. The backend servers 248 can send and receive some or all of the data to various partner servers 274.

Figure 15:
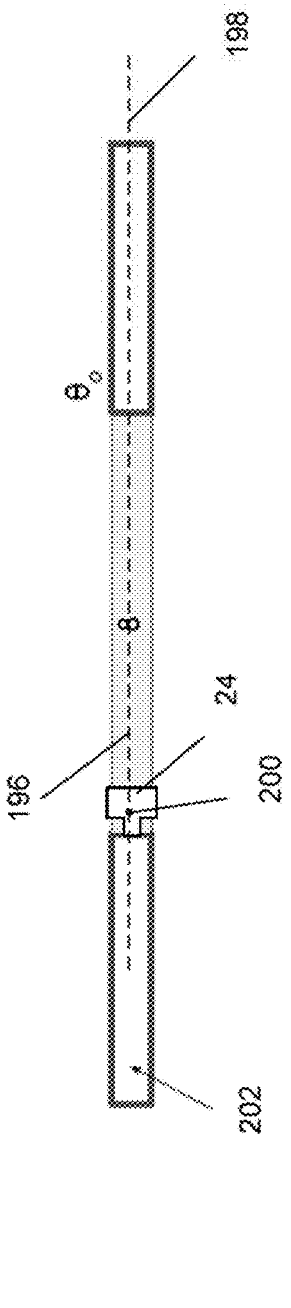
FIG. 15 is a horizontal cross-sectional view of a variation of the locking device mounted in a door in a closed configuration.

FIG. 15 illustrates that the locking device 24 can have one or more position and/or motion tracking elements 200, for example a gyroscope 204, accelerometer, satellite location sensor (e.g., GPS sensor) or combinations thereof (referred to as a gyroscope 204 for brevity). The door 8 can be closed in the door frame 202 so that a door frame axis 198 is collinear with a door lateral axis 196. The door lateral axis 196 can be collinear with the bolt longitudinal axis. The angle between the door frame axis 198 and the door lateral axis 196 can be θ. When the door 8 is closed, θ can be $\theta_0$, for example about 0°. The lateral side of the door away from the gyroscope 204 can be hinged to the door frame 202.

Figure 16:
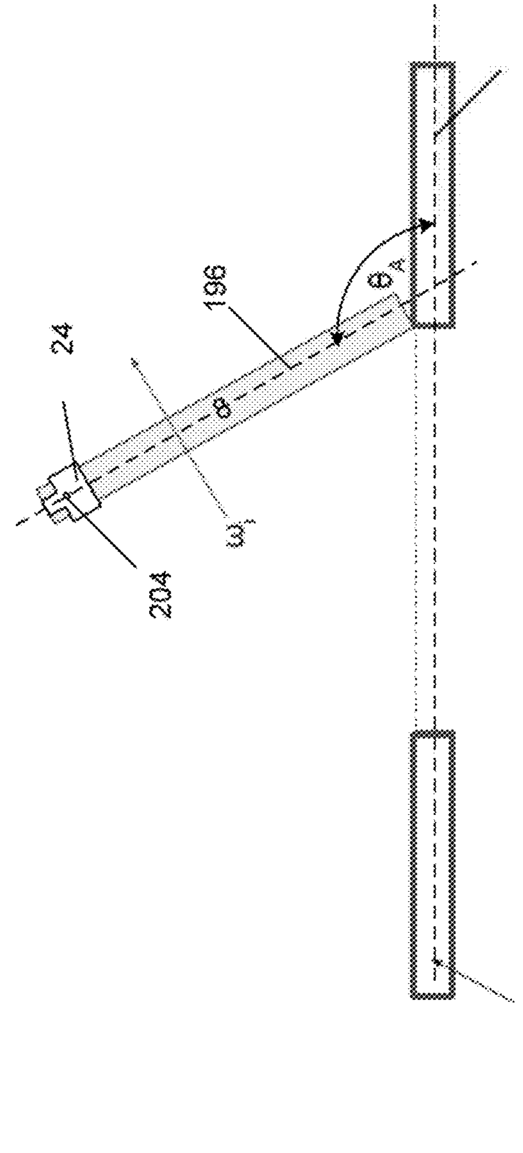
FIG. 16 is a horizontal cross-sectional view of the variation of the locking device mounted in a door from FIG. 15 in an opened configuration.

FIG. 16 illustrates that the door 8 can be rotated open at an angular velocity ω. At a time A, the angular velocity of the door 8 can be ω, and angle of the door 8, θ, can be $\theta_A$. The angle of the door 8, $\theta_A$, can be calculated by one or more processors in the locking device 24 or remote processors in data communication with the locking device 24. For example, the gyroscope 204 can sense the angular velocity of the door 8, ω.

Figure 17:
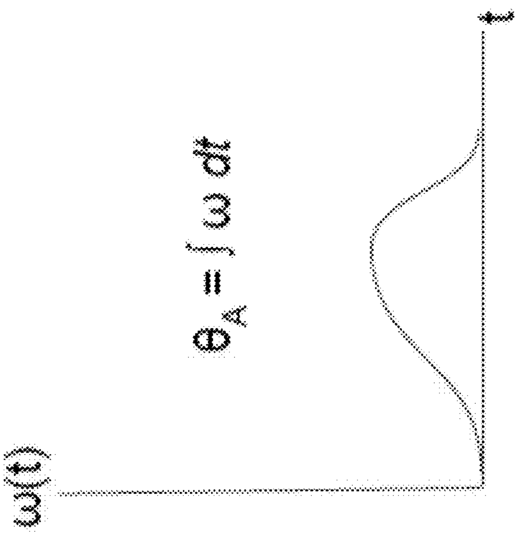
FIG. 17 is a graph of a variation of angular velocity of a door over time during opening of the door.

FIG. 17 illustrates that the angle of the door 8 can be calculated as the area under the curve shown in the graph, as shown by the formula: $\theta_A = \int \omega \, dt$. The device and system can sense the angle of the door 8 and whether the door 8 is open or closed.

Figure 18A:
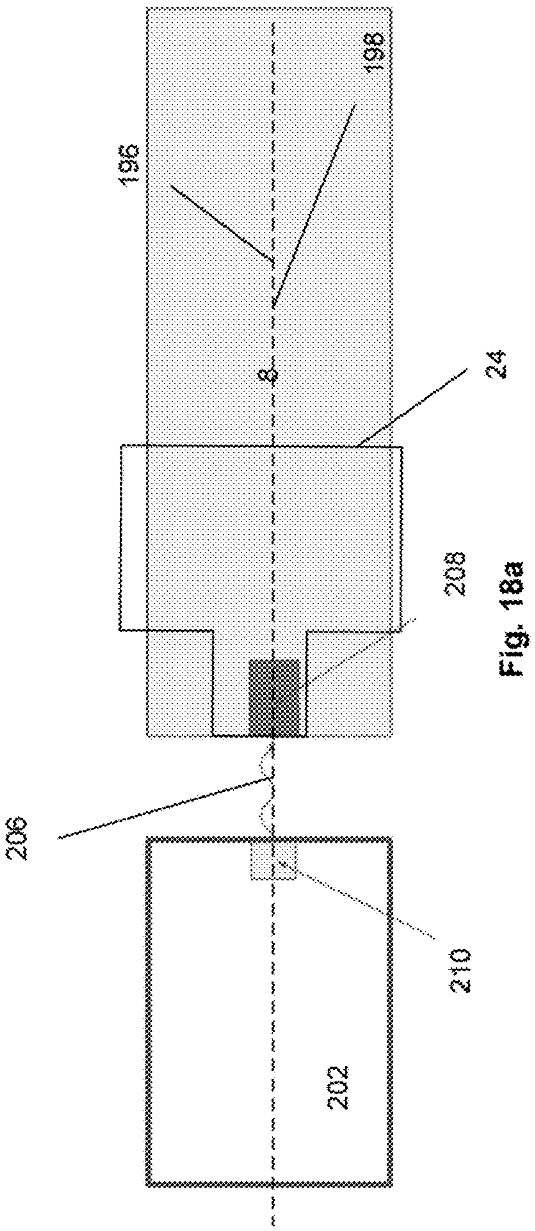
FIG. 18*a* is a horizontal cross-sectional view of a variation of the locking device mounted in a door in a closed configuration.
Figure 18B:
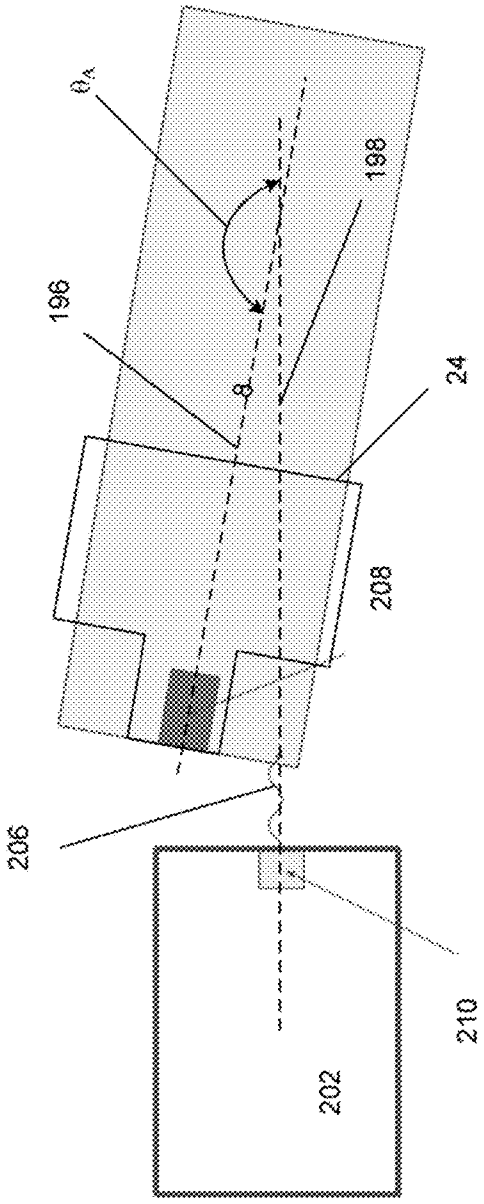
FIG. 18*b* is a horizontal cross-sectional view of the variation of the locking device mounted in a door from FIG. 18*a* in an opened configuration.

FIG. 18*a* illustrates that the locking device 24 can have one or more photon detectors 208 and/or photon emitters 210. The door frame 202 adjacent to the locking device 24, for example in the strike plate 60, can have one or more photon emitters 210 and/or photon detectors 208 corresponding with the photon detectors 208 and/or photon emitters 210 in the locking device 24. For example, the central emitting axes of the photon emitters 210 in the door frame 202 can be collinear with the corresponding central detecting axes of the photon detectors 208 in the door frame 202 and vice versa when the door 8 is closed, as shown in FIG. 18*a*. The central emitting axes of the photon emitters 210 in the door frame 202 (as shown in FIGS. 18*a* and 18*b*) can be and the central detecting axes of the photon detectors 208 in the door frame 202 can be collinear with the door frame axis 198. The central detecting axes of the photon detectors 208 (as shown in FIGS. 18*a* and 18*b*) and the central emitting axes of the photon emitters 210 in the door 8 can be collinear with the door lateral axis 196.

The photon emitters 210 can emit a photon signal 206. All of the photon emitters 210 can emit identical signals or all or some of the photon emitters 210 can emit unique signals. For example, the photon emitters 210 can emit signals that vary in amplitude, wavelength, cycling timing (e.g., a specific sequence of on times and off times for the signal), or combinations thereof. The photon signal 206 can be collimated.

When the photon signals 206 are received by the photon detectors 208, one or more processors in the door 8, the door frame 202 and/or remotely located, can receive data from the photon detectors 208 that the photon signals 206 are being received. The processor or processors can then indicate that the door 8 is closed.

FIG. 18*b* illustrates that when the door 8 is rotated into an opened position, the photon detector 208 cannot detect the photon signals 206. The photon detectors 208 can then send no data or data indicating that no photon signal 206 is being received. The processor or processors can then indicate that the door 8 is opened.

Figure 19A:
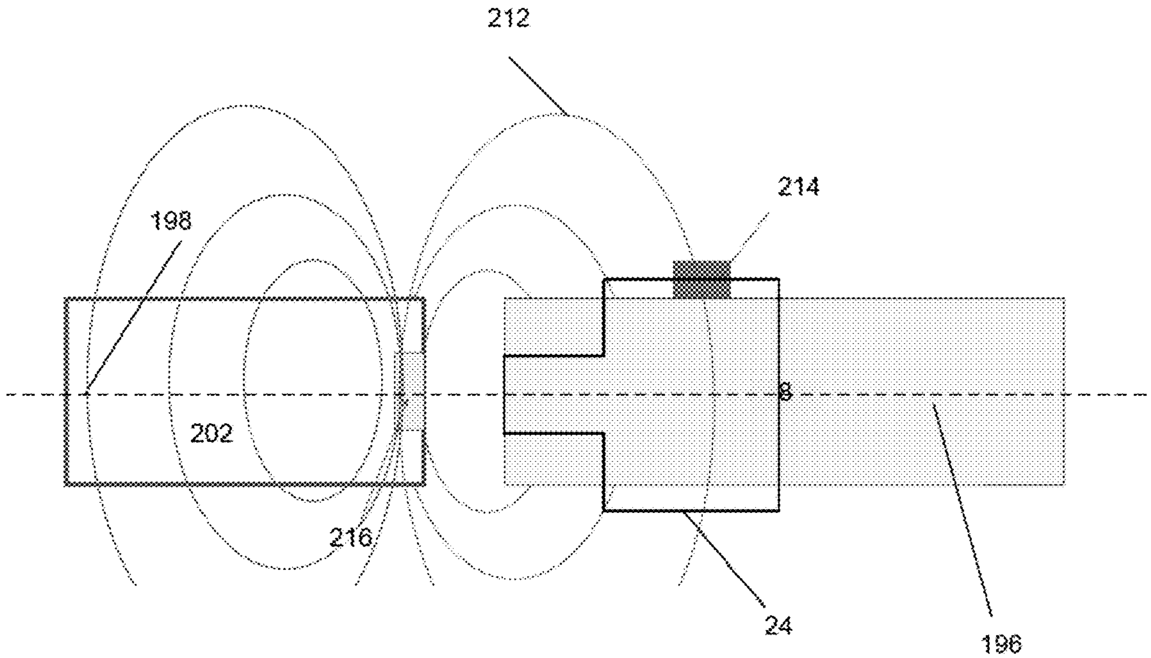
FIG. 19*a* is a horizontal cross-sectional view of a variation of the locking device mounted in a door in a closed configuration.

FIG. 19*a* illustrates that the locking device 24 can have a magnetometer 214. The magnetometer 214 can be positioned adjacent to the magnet 58 when the door 8 is closed, or on the front or rear side of the locking device 24, as shown. The door frame 202 can have one or more embedded permanent magnets 216, for example in the strike plate 60. The entire strike plate 60 can be a permanent magnet. The magnet 58 can create a magnetic field 212. The magnetic field 212 can have a field strength reducing in strength relative to distance away from the magnet 58, as indicated by the field lines.

When the magnet field strength detected by the magnetometer 214 is above the desired field strength to indicate that the door 8 is closed because of the proximity of distance between the magnetometer 214 and the magnet 58, one or more processors in the door 8, the door frame 202 and/or remotely located, can receive data from the magnetometer 214 that a high enough magnet field strength to indicate closured of the door 8 is received. The processor or processors can then indicate that the door 8 is closed.

Figure 19B:
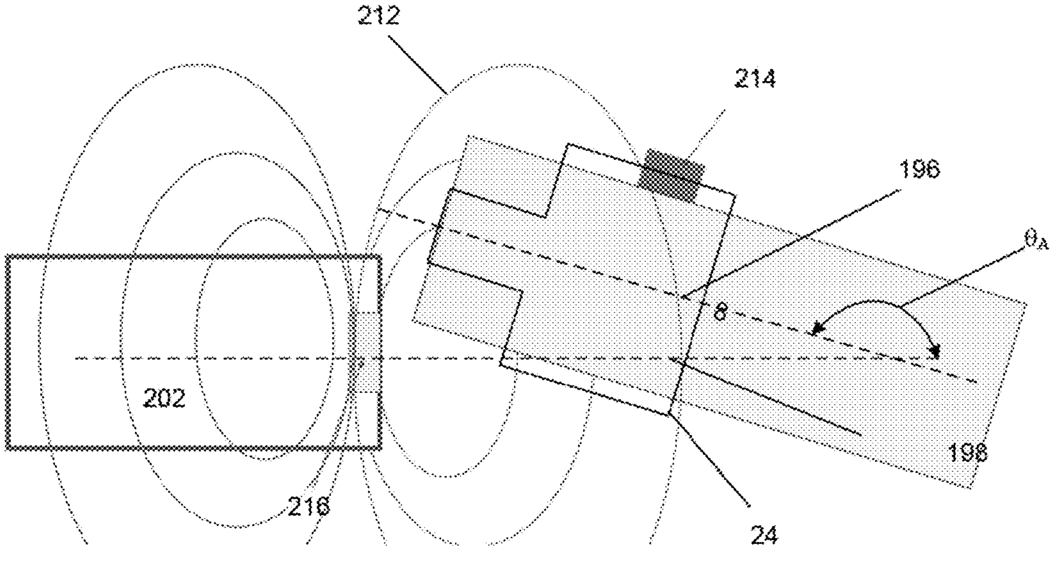
FIG. 19*b* is a horizontal cross-sectional view of the variation of the locking device mounted in a door from FIG. 19*a* in an opened configuration.

FIG. 19*b* illustrates that when the door 8 is rotated into an opened position, the magnetometer 214 may be positioned outside of the magnetic field 212 detectable by the magnetometer 214, or to a position where the magnetic field 212 is weaker than a limit required for the door to be considered closed. The magnetometer 214 can then send no data or data to the processor or processors indicating that the magnetic field 212 is insufficient or not detectable. The processor or processors can then indicate that the door 8 is opened.

Figure 20B:
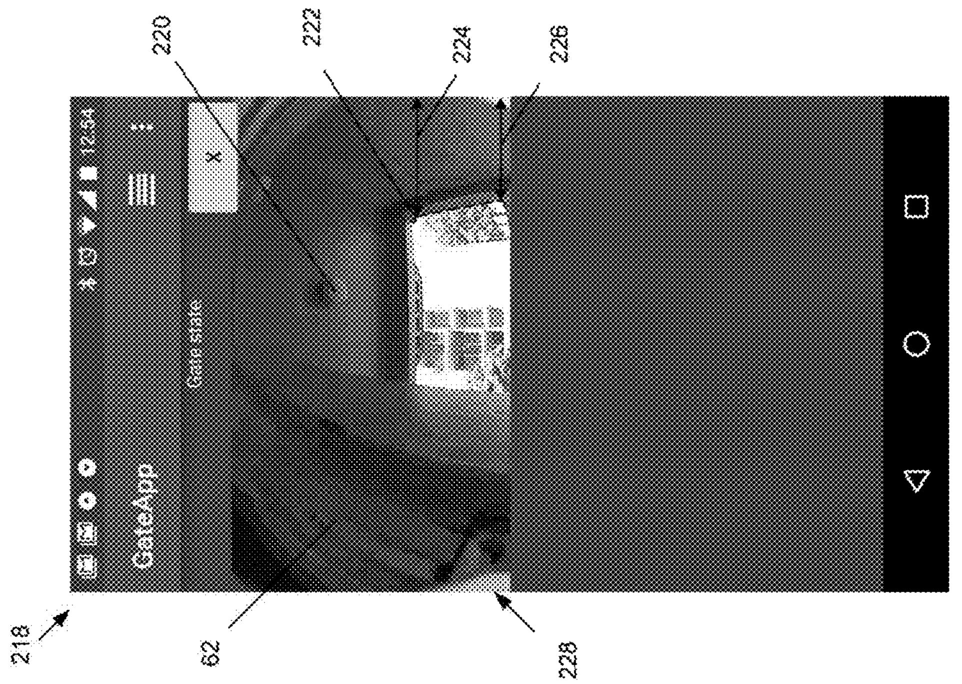
FIG. 20*b* is a screenshot including a variation of an image from the camera from FIG. 20*a* when the door is in an opened configuration.
Figure 20A:
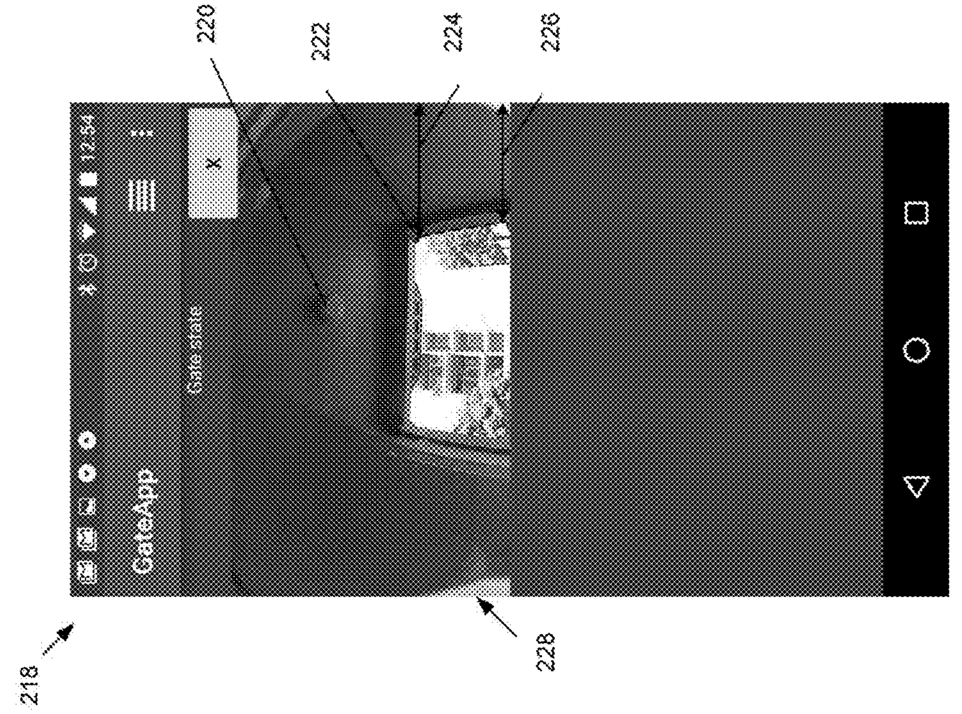
FIG. 20*a* is a screenshot including a variation of an image from the camera when the door is in a closed configuration.

FIG. 20*a* illustrates that the camera 118 can send one or more video images 228, such as one or more individual still frame images or continuously streaming video, to the remote device (e.g., via the app). The images can appear on a screen display 218 of the remote device. One or more processors in the locking device 24, the remote device, or combinations thereof can analyze the video image 228 and record reference data when the door 8 is closed, as shown in FIG. 20*a*.

For example, the processor can identify one or more detected objects 220 and/or detected edges 222 in the reference images when the door 8 is closed. The processor can identify when the door 8 is closed for an image using any of the methods disclosed herein, detecting the most frequently occurring positions for detected objects 220 and edges, determining when frequently detected objects 220 and edges are at their common lateral-most positions in the images (e.g., the right-most position for doors closing to the left, and the left-most position for doors closing to the right), or combinations thereof.

The detected objects 220 can have reference X (horizontal within the image) and Y (vertical within the image) coordinate positions in the reference image for when the door 8 is closed. The detected edges 222 can have reference edge first coordinates 224 and reference edge second coordinates 226. The system can store the reference coordinates in memory for the detected objects 220 and edges when the door 8 is in a closed position.

FIG. 20*b* illustrates that when the door 8 is opened, the coordinates of detected objects 220 and detected edges 222 can change in the image with the door 8 opened compared to the coordinates for the detected objects 220 and edges in the reference images when the door 8 is closed. The processor can compare the reference X and Y coordinates of the detected objects 220 and the edge first and second coordinates with the coordinates of the detected objects 220 and edge first and second coordinates in the image with the door 8 opened.

The processors can analyze all images or sample less than all images to determine whether the door 8 is opened or closed. The processors performing this and any other analysis, calculations or computations described herein, including but not limited to image processing such as computer vision techniques, can be the local processor or processors in the locking device 24, remote processor or processors such as in a server, for example as a backend and/or partner server 274, those in a mobile device wired or wirelessly connected directly or indirectly to the locking device 24 and/or server or servers, or combinations thereof. Remote and local processors can work alone or in combination with each other on any tasks.

When the door 8 is opened, the door jamb 62 can appear in the video image 228. The processor can record the door jamb 62 with the reference coordinates of the detected objects 220 and detected edges 222. The processor can search for the reference door jamb image to detect when the doorjamb 62 is in the current image and indicate or confirm that the door 8 is open.

The processor can calculate the angle of the door opening, $\theta_A$, based on the position of the doorjamb 62, detected objects 220 and detected edges 222 in the image from the open door 8. For example, if the horizontal field of view of the camera 118 is 150°, the camera 118 has an evenly scaled horizontal perspective, and the detected object 220 moves 20% horizontally across the field of view between the reference image when the door 8 is closed and the image when the door 8 is opened, then the processor can conclude that the angle of rotation of the opened door 8, $\theta_A$ is 30° (i.e., 20% of 150°).

The processor or processors can perform computer vision techniques to analyze the images from the camera 118. For example, computer vision techniques can track bodies moving across the field of view of the camera 118. If a person or other visual object in the field of view enters the door 8 (e.g., goes into the home) and does not exit through the doorway (e.g., remains inside of the doorway or stays in the home), for example within a pre-set amount of time, the processor or other component of the system can store and/or transmit to a remote server or mobile device the time, most recent entry code and/or associated data, images and image analysis associated with the event, and/or send an alert to a remote server and/or mobile device that indicate that someone or something entered the doorway and stayed in the doorway or home at all or beyond the pre-set amount of time.

The computer vision techniques for tracking human body models can be applied by the processors on each frame of video, for example to look for human motion. The reference geometry of the door 8 and/or consistent or reliable background objects in the image can be stored by the device or system, as can be which sides of the video images 228 are "inside" and "outside" of the doorway (or home). The computer vision techniques can count and record the number of human bodies moving across the field of view.

The computer vision techniques and/or other processes executed by the processor can track or otherwise keep a running total of the net number of human bodies in the images that have entered and exited the doorway (or home). For example, if the right side of the frame is the opening side of the door 8, and an image identified as a human body moves from the left to the right side of the image and exits the frame when the door 8 is open, that will add one to the total number of human bodies that entered the doorway (and vice versa). If an identified human body image fails to appear from the right side of the frame after a preset amount of time, and/or image processing of the face of the human body of the image fails to identify a face having permission to enter or remain inside of the doorway, the processor can indicate that the human remained inside of the doorway (or home). The locking device 24 or system can then send an alert message and/or data from the event such as a time, images, audio, face recognition data, or combinations thereof, to one or more servers and/or mobile devices (e.g., of the home owners). The servers and/or mobile devices can analyze the alert message and/or data, and manually (e.g., after user review and determination if the alert and/or data warrants further investigation or alert) and/or automatically (after further image processing, such as face recognition analysis) send an alert and/or further data, if triggered, to yet further servers or mobile devices, such as a police and/or alarm company server, a mobile device in a police and/or security vehicle and/or on police or security personnel, or combinations thereof.

The variations and elements of the locking device 24, system, methods, or any other elements and methods herein can be replaced or combined with those taught by U.S. patent application Ser. No. 14/641,047, filed Mar. 6, 2015; Ser. No. 14/641,069, filed Mar. 6, 2016; Ser. No. 14/736,072, filed Jun. 10, 2015; and Ser. No. 14/736,126, filed Jun. 10, 2015, all of which are incorporated by reference herein in their entireties.

Any elements described herein as singular can be pluralized (i.e., anything described as "one" can be more than one). Connectors and wiring within the locking device 24 to connect electrical components to each other is not shown for illustrative purposes but is hereby disclosed. Any species element of a genus element can have the characteristics or elements of any other species element of that genus. The above-described configurations, elements or complete assemblies and methods and their elements for carrying out the invention, and variations of aspects of the invention can be combined and modified with each other in any combination.

We claim:

1. A method for detecting a position of a door comprising:

capturing a reference image data with a camera fixed to the door when the door is in a first position;

capturing a second image data with the camera fixed to the door, wherein the capturing of the second image data is after the capturing of the reference image data;

capturing a third image data with the camera fixed to the door, wherein the capturing of the second image data is after the capturing of the reference image data;

comparing the reference image data to the second image data, wherein the comparing is performed at least in part by a processor;

comparing the reference image data to the third image data, wherein the comparing is performed at least in part by a processor;

wherein when the processor resolves that the second image data matches the reference image data within a preset matching threshold, then the processor resolves that the door is in the first position; and wherein when the processor resolves that the third image data does not match the reference image data within the present matching threshold, the processor then resolves that the door is in a second position.

2. The method of claim 1, further comprising the processor triggering an alert signal when the processor resolves that the door is in the second position.

3. The method of claim 1, wherein the comparing of the reference image data to the second image data comprises edge detection.

4. The method of claim 1, further comprising rotating the door between the first position and a second position.

5. The method of claim 1, further comprising emitting a signal from an emitter attached to a door frame adjacent to the door, and detecting the signal from by a detector attached to the door.

6. The method of claim 1, further comprising attaching a magnetic element to a door frame adjacent to the door, and measuring the magnetic field at a magnetometer attached to the door.

7. The method of claim 1, further comprising sensing the position of the door with an accelerometer attached to the door.

8. The method of claim 1, further comprising sensing the position of the door with a gyroscopic sensor attached to the door.

9. The method of claim 1, further comprising determining if a human body is visible in the second image data.

10. The method of claim 9, further comprising determining if an image of the human body enters through the door.

11. The method of claim 10, further comprising tracking a net number of human bodies inside of a doorway defined by tire door.

12. The method of claim 1, wherein the processor is directly or indirectly attached to the door.

13. The method of claim 1, wherein the processor is remotely positioned from the door.

14. A method for detecting a position of a door comprising:

capturing a reference image data with a camera fixed to the door when the door is in a first position;

capturing a second image data with the camera fixed to the door, wherein the capturing of the second image data is after the capturing of the reference image data;

comparing the reference image data to the second image data, wherein the comparing is performed at least in part by a processor;

determining if an image of the human body enters through the door;

tracking a net number of human bodies inside of a doorway defined by the door, and sending data to a remote processor based at least partially on when the net number of human bodies inside of the doorway exceeds a preset number for a preset amount of time;

wherein when the processor resolves that the second Image data matches the reference image data within a preset matching threshold, then the processor resolves that the door is in the first position.

15. A system for detecting a position of a door comprising:

a camera fixed to the door, wherein the camera is configured to capture a reference image data when the door is in a first position, and wherein the camera is configured to capture a second image data; wherein the camera is configured to capture a third image data; and a processor attached to the door, wherein the camera is in data communication with the processor, and wherein the processor is configured to compare the reference image data to the second image data, wherein the processor is configured to compare the reference image data to the third image data and wherein the processor is configured such that when the processor resolves that the second image data matches the reference image data within a preset matching threshold then the door is in the first position, and wherein the processor is configured such that when the processor resolves that the third image data does not match the reference image data within a preset matching threshold then the door is in a second position.

16. A system for detecting a position of a door comprising:

a camera fixed to the door, wherein tire camera is configured to capture a reference image data when the door is in a first position, and wherein the camera is configured to capture a second image data; wherein the camera is configured to capture a third image data and a processor in direct or indirect wireless communication with the camera, and wherein the processor is configured to compare the reference image data to the second image data, wherein the processor is configured to compare the reference image data to the third image data and wherein the processor is configured such that when the processor resolves that the second image data matches the reference image data within a preset matching threshold then the door is in the first position, and wherein the processor is configured such that when the processor resolves that the third image data does not match the reference image data within a preset matching threshold then the door is in a second position.

17. The system of claim 16, wherein the processor is in a server in data communication with the camera via a wide area network.

* * * * *